(12) United States Patent
Moyes et al.

(10) Patent No.: US 7,858,056 B2
(45) Date of Patent: Dec. 28, 2010

(54) RECOVERING METALS FROM SULFIDIC MATERIALS

(75) Inventors: John Moyes, Forrestville (AU); Frank Houllis, Lakemba (AU)

(73) Assignee: INTEC, Ltd., Sydney (AU)

( * ) Notice: Subject to any disclaimer, the term of this patent is extended or adjusted under 35 U.S.C. 154(b) by 863 days.

(21) Appl. No.: 10/541,149

(22) PCT Filed: Dec. 19, 2003

(86) PCT No.: PCT/AU03/01700

§ 371 (c)(1),
(2), (4) Date: Mar. 7, 2006

(87) PCT Pub. No.: WO2004/059018

PCT Pub. Date: Jul. 15, 2004

(65) Prior Publication Data

US 2007/0014709 A1    Jan. 18, 2007

(30) Foreign Application Priority Data

Dec. 31, 2002 (AU) ............................. 2002953566
May 2, 2003 (AU) ............................. 2003902311
Jun. 20, 2003 (AU) ............................. 2003903167

(51) Int. Cl.
*C01G 55/00* (2006.01)
(52) U.S. Cl. .......................... 423/22; 423/27; 423/38; 423/25; 75/744; 205/570
(58) Field of Classification Search ............. 423/22, 423/27, 25, 38–40; 75/711, 744; 205/347, 205/570
See application file for complete search history.

(56) References Cited

U.S. PATENT DOCUMENTS 2,283,198 A    5/1942    Fink et al.

(Continued)

FOREIGN PATENT DOCUMENTS

AU    B-75848/81    4/1982

(Continued)

OTHER PUBLICATIONS

Adams M D et al., "Characterization and Blinding of Carbonaceous Preg-Robbers in Gold Ores", Minerals Engineering, Pergamon Press, Oxford, GB, vol. 11, No. 10, (1998), pp. 919-927, XP001168630, ISSN: 0892-6875.

(Continued)

*Primary Examiner*—Stuart Hendrickson
*Assistant Examiner*—Richard M Rump
(74) *Attorney, Agent, or Firm*—Patterson Thuente Christensen Pedersen P.A.

(57) ABSTRACT

A process for recovering a precious metal from a sulfidic material comprises the steps of preparing an acidic aqueous halide solution having an oxidation potential sufficient to oxidize the sulfidic material and render the precious metal soluble in the solution, adding the material to the acidic aqueous halide solution so that the sulfidic material is oxidized and the precious metal is solubilized and separating the precious metal from the oxidized sulfidic material. In addition, a process for removing a contaminant from a contaminated sulfidic material comprises the steps of mixing the material in an aqueous solution wherein a multi-valent species of a relatively high oxidation state oxidizes the contaminant to render it soluble in the solution, produces a contaminant refined material, and is reduced to a relatively lower oxidation state; and removing the contaminant from the solution while regenerating the multi-valent species to its relatively high oxidation state.

18 Claims, 9 Drawing Sheets

U.S. PATENT DOCUMENTS

| | | | |
|---|---|---|---|
| 2,835,569 A | | 5/1958 | Francis et al. |
| 4,097,271 A | | 6/1978 | Swinkels et al. |
| 4,342,592 A | * | 8/1982 | Lamb .......................... 75/733 |
| 4,406,864 A | | 9/1983 | Weir et al. |
| 4,551,213 A | | 11/1985 | Wilson et al. |
| 4,647,307 A | | 3/1987 | Raudsepp et al. |
| 4,773,978 A | | 9/1988 | Thomassen et al. |
| 4,786,323 A | | 11/1988 | Gock et al. |
| 4,878,945 A | | 11/1989 | Raudsepp et al. |
| 5,196,095 A | * | 3/1993 | Sudderth et al. ............ 205/516 |
| 5,338,338 A | | 8/1994 | Kohr et al. |
| 5,458,866 A | | 10/1995 | Simmons |
| 5,487,819 A | * | 1/1996 | Everett ....................... 205/347 |
| 5,620,585 A | | 4/1997 | Dadgar et al. |
| 5,820,966 A | | 10/1998 | Krause et al. |
| 5,827,348 A | | 10/1998 | Waddell et al. |
| 2002/0152845 A1 | | 10/2002 | Fleming |
| 2003/0129112 A1 | | 7/2003 | Vinals Olia et al. |

FOREIGN PATENT DOCUMENTS

| | | |
|---|---|---|
| AU | 32990 02 A | 10/2002 |
| AU | 200232990 B2 | 10/2002 |
| CA | 2025116 | 3/1991 |
| EP | 0 522 978 A | 1/1993 |
| EP | 0 522 978 A1 | 1/1993 |
| JP | 2001-049481 | 2/2001 |
| RU | 2179594 | 2/2002 |
| WO | WO 84/00563 | 2/1984 |
| WO | WO 00/11228 | 3/2000 |
| WO | WO 02/42503 | 5/2002 |
| WO | WO 03/091463 | 11/2003 |
| WO | WO 03/091463 A1 | 11/2003 |

OTHER PUBLICATIONS

Ed. by Fathi Habashi: Handbookof Extractive Metallurgy 1997, Wiley-VCH, Germany, XP002417043, pp. 1183-1194 and pp. 1211-1213.

Habashi, "Handbook of Extractive Metallurgy," 1997, p. 1183-1194 and 1211-1213, Germany.

La Brooy, "Review of Extraction from Ores," Minerals Engineering 1994, vol. 7, No. 10, pp. 1213-1241, Great Britain.

Dahya et al., "Developments in Carbon-in-Pulp technology for gold recovery," CIM Bulletin, 1983, vol. 76, No. 857, Canada.

Supplementary Partial European Search Report, dated May 4, 2007.

* cited by examiner

Continuous As Leach

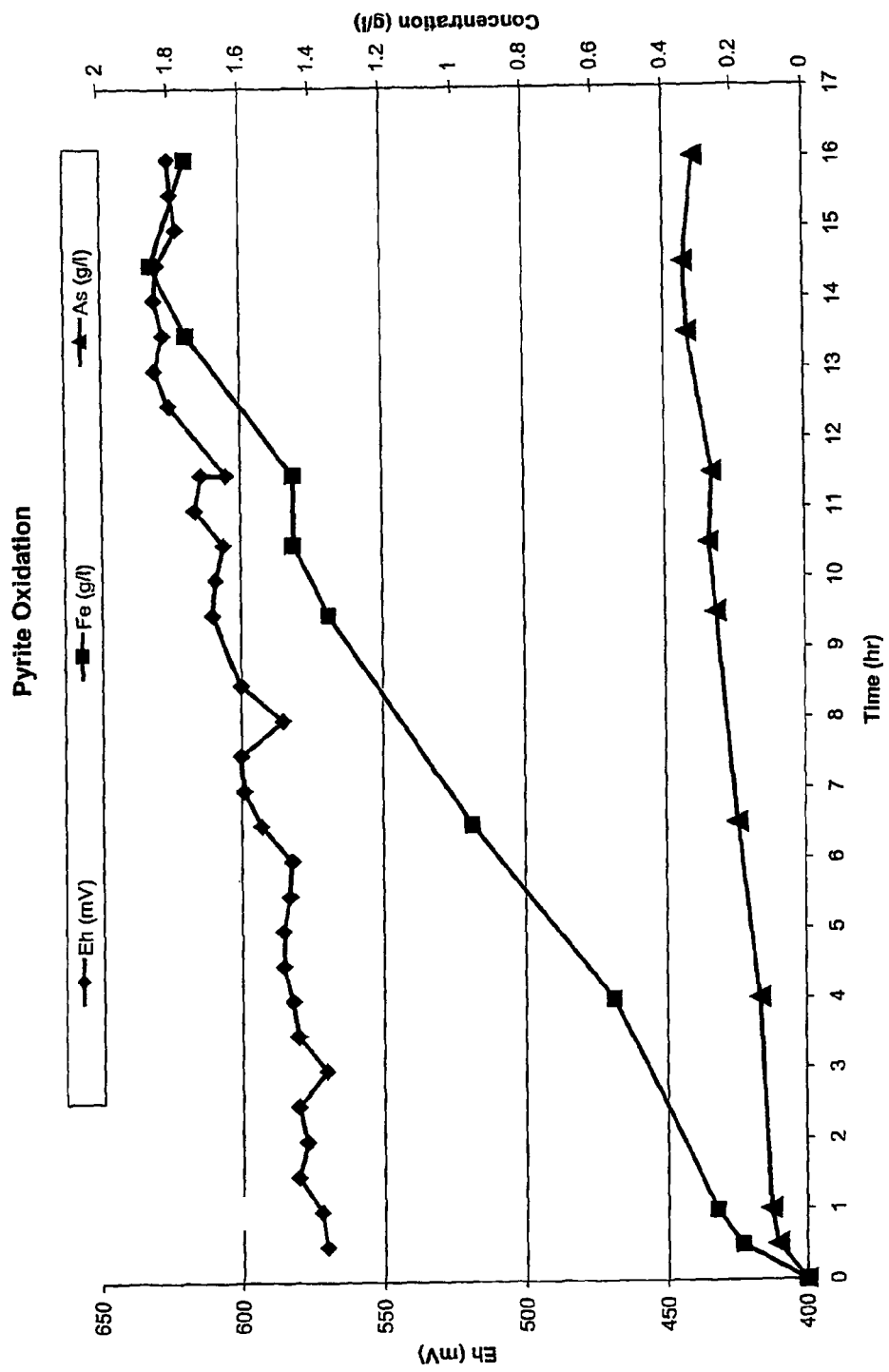

RECOVERING METALS FROM SULFIDIC MATERIALS

RELATED APPLICATION

This application claims priority under 35 U.S.C. §371 to International Application PCT/AU2003/001700, published as WO2004/059018, the entire disclosure of which application is hereby incorporated herein by reference in its entirety.

FIELD OF THE INVENTION

The present invention relates to a process for recovering metals, especially precious metals such as gold, from a sulfidic material. The process can be applied to both un-contaminated and contaminated sulfidic materials, including those having a relatively high carbon content (a so-called "double-refractory material") or no or low carbon content (a so-called "single-refractory material"). When the term "relatively high carbon content" is used herein it refers to a carbon content in the sulfidic material that is typically higher than about 2 wt %.

BACKGROUND TO THE INVENTION

Across the world there are significant deposits and quantities of sulfidic materials including economically desirable metals to recover, especially precious metals such as gold and silver. For example, there are significant deposits and stockpiles of pyritic ores including gold and/or silver and other precious metals such as platinum and platinum group metals.

Some of these deposits are contaminated with difficult to process contaminants such as arsenic, antimony, bismuth or other heavy metals. Ore treatment may also be complicated when high levels of carbon are present, as carbon associates with and has a high affinity for precious metals such as gold.

Current commercially available options for the oxidation of sulfidic materials include roasting, pressure oxidation (POx) and bio-oxidation (Biox). In the POx and Biox processes a sulfate medium is typically employed.

Roasting sulfidic ores presents significant problems due to emissions of environmentally toxic sulfur based gases (so-called SOx gases). Where arsenic is present in the ore, poisonous substances such as arsenic trioxide are produced. For these reasons international trends are to move away from roasting of sulfide ores.

Pressure oxidation of sulfidic materials is employed to avoid the problems of roasting, but requires high pressures (typically greater than 30 bar) and relatively high temperatures (greater than 200° C.). Pressure oxidation is also typically carried out in a sulfate based solution.

U.S. Pat. No. 6,461,577 discloses a bio-oxidation process for treating sulfidic materials containing arsenic where the sulfidic material is subjected to a two-stage Biox process to solubilise the arsenic. The configuration of the leaching process is complex, as is the use of bio-leaching bacteria In addition, bio-oxidation is notoriously slow.

U.S. Pat. No. 4,053,305 discloses a leaching process for the recovery of copper and silver from a sulfide ore using a combination of ferrous chloride solution and pressurised oxygen. Whilst copper is dissolved in the leach, silver is deliberately not leached and is passed with the solid residue from the leach. The silver must then be extracted from the residue using sodium cyanide, an environmentally harmful leaching agent.

U.S. Pat. No. 4,410,496 discloses a leaching process for the recovery of copper, lead and zinc from a sulfide ore using a combination of calcium or barium chloride solution and pressurised oxygen. Again, precious metals in the ore remain unleached and pass with the solid residue from the leach and must be separately extracted.

U.S. Pat. No. 4,655,829 discloses a leaching process for the recovery of metals from a sulfide ore that comprises arsenic and antimony. In this process a bulk sulfide concentrate is prepared from the arsenic sulfide ore. The concentrate is slurried in excess calcium chloride solution. Once the concentrate is prepared, the total metal content and composition of the concentrate needs to be determined. To prevent soluble arsenic compounds or toxic arsenic vapours being created in the process the concentrate is blended with a balancing solution slurry containing a predetermined concentration of copper, lead, zinc, or a mixture thereof in the form of sulfides of those metals. In this regard, the concentrate and the balancing solution slurry are combined to form a reaction slurry having a predetermined metal content such that the molar concentration of arsenic and antimony in the mixture is about equal to the molar concentration of copper, lead, and zinc, ranging from between about 60-40 or 40-60. Only once the mixture is properly balanced is it heated and aerated under pressure to oxidise the metals to soluble components. In other words, the balancing is essential so that no soluble arsenic compounds or toxic arsenic vapours are created.

It would be advantageous if a simple hydrometallurgical process could be provided for recovering a precious metal, especially gold, from a sulfidic material.

SUMMARY OF THE INVENTION

In a first aspect the present invention provides a process for recovering a precious metal from a sulfidic material comprising the steps of:
preparing an acidic aqueous halide solution having an oxidation potential sufficient to oxidise the sulfidic material and render the precious metal soluble in the solution;
adding the material to the acidic aqueous halide solution so that the sulfidic material is oxidised and the precious metal is solubilised; and
separating the precious metal from the oxidised sulfidic material.

The present inventors have surprisingly discovered that when a sufficient oxidation potential is maintained in the acidic halide solution, the sulfidic material can be oxidised simultaneously with precious metal solubilisation in a single stage.

Furthermore, the inventors have surprisingly discovered that when the sulfidic material is contaminated with arsenic, antimony or the like the precious metal can be solubilised whilst the arsenic etc can be simultaneously leached and precipitated in a single stage without the need for a prior or initial solution balancing step.

In this regard, in a second aspect, the present invention provides a process for recovering a precious metal from a contaminated sulfidic material comprising the steps of:
preparing an acidic aqueous halide solution having an oxidation potential sufficient to oxidise the sulfidic material and render the precious metal soluble in the solution, and having a pH at which the arsenic is precipitated;
adding the material to the acidic aqueous halide solution so that the sulfidic material is oxidised, the precious metal is solubilised and the arsenic is precipitated; and
separating the precious metal from the oxidised sulfidic material and precipitated arsenic.

The process of the first and second aspects also differs from the POx and Biox processes in that a halide rather than sulfate-based leaching solution is employed.

The inventors have noted that halides (like cyanide) form strong complexes with precious metals such as gold and can thereby facilitate precious metal dissolution and subsequent precious metal recovery by eg. carbon adsorption. However, because halides are weaker ligands than cyanide, the inventors have developed a processology in which a sufficiently high oxidation potential (Eh) in an acidic environment (preferably of pH<3) achieves a dissolution capability of the precious metal similar to cyanide.

Advantageously, the process can be operated in a closed loop or recycle mode with attendant economic benefits (eg. simplicity, low energy consumption, preservation of mass balance etc.). The inventors have also observed that the process can be applied to recover precious metals from any sulfidic material, including otherwise difficult to treat ores and concentrates such as double-refractory materials having a relatively high carbon content (eg. carbon-containing arsenopyrites).

Preferably the solution bearing the precious metal is separated from the oxidised sulfidic material and precipitated arsenic (when present) in a solid-liquid separation stage, and the precious metal is then recovered from the solution in a metal recovery stage, preferably by adsorption onto activated carbon, typically in one or more carbon-containing columns. Preferably after precious metal adsorption onto activated carbon the carbon is removed and burnt to recover the precious metal, or is eluted with a cyanide solution and the eluate passed to an electrolysis stage for recovery of the precious metal by electro-winning. In this regard, the present process advantageously differs from current commercial processes, where cyanidation of the oxidation residue is required for precious metal (gold) extraction, requiring a separate dedicated leach circuit. In the present invention the precious metal is already solubilised in the leach, so cyanide leaching is not required. In addition, many environmental authorities now require the destruction of residual cyanide, especially in environmentally sensitive locations, which can add additional costs.

In the case of an un-contaminated sulfidic material (eg. a single refractory pyritic ore uncontaminated by arsenic etc) the oxidation of the sulfidic material is typically performed in one stage. In the case of a contaminated sulfidic material (eg. a single or double refractory pyritic ore contaminated by arsenic and/or carbon etc) the oxidation of the sulfidic material is typically performed in two stages, although precious metal solubilisation is achieved in a first of these stages.

Typically the solution is recycled to the sulfidic material oxidation stage after it has passed through the metal recovery stage. Preferably the metal recovery stage is provided in-line, after the solid-liquid separation stage, and prior to solution recycle to the sulfidic material oxidation stage. Use of the terminology "in-line" refers to a stage that is provided as part of a solution circuit (ie. the "circuit" resulting from solution recycle to the sulfidic material oxidation stage). In addition, metal recovery processes other than carbon adsorption may be employed including ion exchange, solvent extraction, etc.

In the case of a double-refractory ore that includes carbon, an additional separate metal recovery stage may need to be provided (ie. separate to the solution recycle circuit) to recover any precious metal that passes with material solids from the sulfidic material oxidation stage. This separate stage may be required because some of the precious metal (eg. gold) passes with the carbon right through the oxidation process and is not solubilised. The separate metal recovery stage may employ a conventional roasting or smelting process and optionally leaching (eg. using solution from the sulfidic material oxidation stage) may be employed after roasting to recover any remaining precious metal in the roasted solids material (eg. gold).

Typically the precious metal to be recovered is gold, but can be silver, platinum or another platinum group metal, the recovery of which metal typically justifies the process economics.

Most preferably the aqueous halide solution is a soluble metal halide solution, typically having a halide concentration of approximately 8 moles per litre. Preferably the halide is chloride, but can be bromide or a mixture of halides such as chloride and bromide.

The process is preferably operated such that the metal in the dissolved metal halide solution functions as a multi-valent species. In this regard, a multi-valent species is typically selected that has both a relatively high oxidation state to participate in oxidation of the sulfidic material and a relatively lower oxidation state to which it is reduced during oxidation. Advantageously, the multi-valent species can then be regenerated to its relatively high oxidation state, whereafter the regenerated multi-valent species can be recycled to the sulfidic material oxidation stage to participate in further oxidation. Advantageously, the regeneration of the multi-valent species occurs during the leaching stage(s) so that the regenerated species can be recycled to the sulfidic material oxidation stage as part of the preferred closed loop or recycle mode of the process, with the attendant economic benefits (eg. preservation of mass balance, simplicity, low energy consumption, etc.).

Typically the metal in the metal halide solution is copper, but may also be iron etc. Either of these multi-valent species effectively acts as an electron transfer agent. For example, in the solution recycled to the sulfidic material oxidation step the metal is in its relatively high oxidation state (eg. Cu(II) or Fe(III)), and after oxidation is in its relatively lower oxidation state (eg. Cu(I) or Fe (II)). In the leaching stages the multi-valent species typically exists as a couple (ie. in its high and low oxidation states). However, other multi-valent species may be employed including possibly cobalt, manganese and vanadium.

Where the sulfidic material is an arsenopyrite, by controlling the oxidation potential, arsenic can be leached into solution in a first leaching stage. However, preferably the solution pH is controlled such that, once leached, the arsenic precipitates as ferric arsenate (scorodite). Again, where the sulfidic material is an arsenopyrite, preferably the pyrite component is leached in a second leaching stage in which the solution pH is also controlled to maintain arsenic as a ferric arsenate precipitate. Thus, the arsenic passes out of the process with the solid residue at the solid-liquid separation stage and does not interfere with precious metal recovery.

For an uncontaminated single-refractory pyritic material the sulfidic material oxidation step typically comprises a single leaching stage in which the pyritic material is oxidised and the precious metal simultaneously solubilised.

Each leaching stage may be operated co- or counter-currently and in this regard, each stage may comprise one or more vessels.

Preferably the entire solution from the first leaching stage is fed to the second leaching stage.

When the sulfidic material is contaminated with eg. arsenic, typically in the first leaching stage the material is contacted with solution at an Eh sufficient to leach the contaminant and solubilise the precious metal (eg. gold), preferably at an Eh of around 0.7-0.8 volts (ref SHE). At this solution Eh the pyrite component of the material is not substantially leached. Preferably in the first leaching stage the solution pH is less than 1 but greater than about 0.5 so as to precipitate the contaminant immediately after it is leached. Preferably in the first leaching stage the solution temperature is about 80-105° C., more typically 80-95° C.

For an un-contaminated sulfidic material (where a single leaching stage is employed) or for the second leaching stage employed for leaching the pyrite component of a contaminated sulfidic material, typically the material is contacted with a solution having an Eh sufficient to leach pyrite, preferably an Eh of around 0.8-0.9 volts. Again, typically the solution pH is less than 1 but is greater than about 0.2 so as to precipitate the contaminant immediately after it is leached. Also, for pyrite leaching, typically the solution temperature is the same or higher than for arsenopyrite leaching, typically about 90° C. to 105° C.

To achieve a higher solution Eh in the single or second leaching stage, it may be necessary to add additional oxidant such as oxygen, air, chlorine gas, hydrogen peroxide etc. To achieve optimal solution pH to maintain the contaminant in its precipitated form and to regenerate cupric ion an acid such as sulfuric acid and/or a base such as calcium carbonate may need to be added to the single or second leaching stage to lift the pH, otherwise arsenic and iron will not precipitate and rather will solubilise. In this regard, in either the single or second leaching stage, oxidation of the pyritic component of the material may produce sufficient or excess sulfuric acid. Alternatively, hydrochloric acid or any other acid which does not interfere with the process chemistry can be employed.

Whereas the separated solution after leaching is passed to precious metal recovery, the separated residual solids are typically passed to disposal.

Preferably after precious metal recovery a solution conditioning stage is employed to remove (precipitate) ferric sulfate and thus control the level of this species in the process. Typically in this stage limestone and calcium carbonate are added to the solution to form a hematite/gypsum precipitate which is then filtered and disposed of with the solids residue from the leaching stage(s). However, ferric removal is preferably controlled by regulating limestone addition to maintain some iron in solution, which in turn prevents cupric copper precipitation (ie. because iron precipitates at a lower pH than copper and buffers the pH whilst it precipitates, thereby acting as a safeguard against copper precipitation).

Preferably in the solid-liquid separation stage solids residue is filtered from the solution, however other separation methodologies may be employed such as solid/liquid settling, solution evaporation, centrifugation etc.

When a high level of carbon is present in the sulfidic material (eg. 2-20 wt % carbon), a surfactant such as a blinding agent can advantageously be added to the solution during sulfidic material oxidation to prevent precious metals (such as gold) from adsorbing onto carbon in the material. The blinding agent is typically one or more organic solvents including kerosene, phenol ethers, etc. Alternatively, activated carbon can be added to the solution to preferentially adsorb gold. The use of a blinding agent or activated carbon may obviate the need for a separate metal recovery stage to separate any precious metal which may otherwise pass with the carbon in the solids residue.

A most advantageous application of the present process is in relation to the recovery of precious metals from pyritic ores and concentrates, where typically the contaminant is arsenic, antimony, bismuth, mercury, cadmium, etc and which occur naturally in many as-mined pyritic materials.

Other economically significant metals may additionally be recovered in the process including copper, nickel, zinc, lead etc. In addition, in certain applications, the contaminant may itself be desirable or necessary to recover. For example, the contaminant may be economically valuable or environmentally harmful, prompting its recovery from the contaminant precipitate (eg. this may be the case for a contaminant such as antimony, bismuth, cadmium etc.).

The process of the second aspect is employed where the sulfidic material is contaminated with arsenic, antimony or the like. In this process the precious metal is solubilised whilst the contaminant is simultaneously leached and precipitated in a single stage without the need for a prior or initial solution balancing step. In some applications, for example, where the contaminant is to be separately recovered (eg. because it has some economic value), or merely as an alternative to the process of the second aspect, it may be desirable for contaminant precipitation to be separated from contaminant leaching.

Accordingly, in a third aspect the present invention provides a process for removing a contaminant from a contaminated sulfidic material comprising the steps of:
    mixing the material in an aqueous solution wherein a multi-valent species of a relatively high oxidation state oxidises the contaminant to render it soluble in the solution, produces a contaminant refined material and is reduced to a relatively lower oxidation state; and
    removing the contaminant from the solution whilst regenerating the multi-valent species to its relatively high oxidation state.

This process again advantageously enables the recovery of metals, especially precious metals such as gold, associated with the contaminated sulfidic material. In addition, by removing the contaminant whilst regenerating the multi-valent species, the process can advantageously be operated in a closed loop or recycle mode with the attendant economic benefits such as simplicity, low energy consumption, preservation of mass balance etc.

In some other applications, for example, where a contaminant needs to be removed prior to conventional roasting or smelting of a sulfide ore, or merely as another alternative to the process of the second aspect, it may again be desirable for contaminant precipitation to be separated from contaminant leaching.

Accordingly, in a fourth aspect the present invention provides a process for removing a contaminant from a contaminated sulfidic material comprising the steps of:
    mixing the material in an aqueous solution having an oxidation potential controlled to oxidise substantially only the contaminant to render it soluble in the solution, thereby producing a contaminant refined material; and
    separating the solution from the contaminant refined material.

By controlling the oxidation potential the process of the fourth aspect advantageously enables the contaminant to be maintained in a soluble form, thus facilitating its subsequent removal (eg. in a separate precipitation step).

For example, where the material is an arsenopyrite and the contaminant is arsenic, the oxidation potential can be controlled in eg. a first leaching stage such that the arsenic is oxidised and solubilised and pyrite is not oxidised. In addition, in the process of the third and fourth aspects, once the arsenic has been solubilised and separated, the remaining pyrite component can then be oxidised more vigorously in a subsequent (eg. second) leaching stage.

The terminology "contaminant refined material" includes a material in which the contaminant has not been completely removed therefrom, but which has sufficiently low contaminant levels such that it can be acceptably further processed (eg. in roasters and smelters) or meets acceptable environmental standards for disposal etc. The process of the third and fourth aspects is typically used to treat pyritic ores or concentrates, where typically the contaminants include arsenic, antimony, bismuth, mercury and cadmium. These contaminants occur naturally in many as-mined pyritic materials. The process of the third and fourth aspects can also be applied to difficult to treat ores and concentrates such as arsenopyrites, especially double-refractory ores having a high carbon content.

In the process of the third and fourth aspects the contaminant is typically removed from the solution by precipitation in a separate precipitation stage by introducing an oxidant into the solution. Advantageously the oxidant can simultaneously cause the multi-valent species to be oxidised to its relatively high oxidation state. Then, after precipitating and removing the contaminant and regenerating the multi-valent species to its higher oxidation state, the solution can be recycled to the leaching stage.

In the precipitation stage the solution pH is typically maintained at around pH 1.5-3. The solution pH is typically maintained by regulating the supply to the solution of the oxidant and/or an alkali agent. When addition of an alkali agent is required an alkali salt such as calcium carbonate, calcium oxide, sodium carbonate, sodium bicarbonate etc. is typically added.

In the precipitation stage the oxidant typically causes the contaminant to precipitate by oxidising it to a relatively less soluble form (eg. oxidising arsenic from its +3 to +5 oxidation state), and at the same time oxidises the multi-valent species. The oxidant can be air, oxygen, chlorine gas, hydrogen peroxide etc. In pyritic ores the contaminant typically precipitates as an iron/contaminant-oxidate form (eg ferric arsenate when the contaminant is arsenic).

After contaminant precipitation, solution Eh and pH are typically restored to levels required for contaminant leaching, to enable solution recycle to the leaching stage. This can be achieved by eg. regulating the addition of oxidant after contaminant precipitation.

In the process of the third and fourth aspects the contaminant can be oxidised and leached into solution in a single or multi stage leaching process. Typically the leaching process comprises a first leaching stage in which the oxidation potential is controlled to oxidise substantially only the contaminant to render it soluble in the solution, and a second leaching stage in which the oxidation potential is increased to oxidise sulfide in the contaminant refined material. In this regard, preferably a bulk of contaminant is oxidised and solubilised in the first leaching stage and residual contaminant can be oxidised in the second leaching stage.

Again, each leaching stage may be operated co- or counter-currently and in this regard, each stage may comprise one or more vessels.

The contaminant refined material is typically separated from the solution after the first leaching stage and is fed to the second leaching stage. In addition, the solution is typically separated from the contaminant refined material after each leaching stage for removal of contaminant therefrom, typically by precipitation in the precipitation stage.

In the process of the third and fourth aspects, when the sulfidic material is a pyritic material (eg. an arsenopyrite or other contaminated pyrites), in the first leaching stage the contaminant is typically oxidised in an acidic aqueous solution of pH typically less than 1, at a solution Eh sufficient to oxidise the contaminant into solution but not substantially leach pyrite, typically an Eh of around 0.7-0.8 volts (ref SHE), and typically at a temperature up to about 105° C. In the second leaching stage the pyritic material is also oxidised in an acidic aqueous solution of pH typically less than 1, but at a higher solution Eh sufficient to leach pyrite, typically at an Eh of around 0.8-0.9 volts, and at a temperature up to about 105° C. To achieve the higher solution Eh in the second leaching stage, an oxidant such as oxygen, air, chlorine gas, hydrogen peroxide etc. can be added to the solution. Again, as necessary, an acid such as sulfuric acid may be added.

In the second leaching stage, to maintain a low solution pH for pyrite oxidation and to solubilise any residual arsenic which is typically present in its +5 oxidation state, the addition thereto of an acid may also be required, such as sulfuric acid, hydrochloric acid or any other acid which does not interfere with the process chemistry. However, the addition of an acid may not be required (eg. where sulfur present in the ore or concentrate is oxidised and thereby generates sufficient sulfuric acid in the solution).

As with the process of the first and second aspects the solution recycled throughout the leaching and precipitation stages is typically a dissolved metal chloride solution having a chloride concentration of approximately 8 moles per liter, and the metal in the dissolved metal chloride solution functions as the multi-valent species (as defined in the process of the first and second aspects).

As with the process of the first and second aspects, when a high level of carbon is present in the sulfidic material (eg. 2-20 wt % carbon), a surfactant such as a blinding agent can advantageously be added to the solution during the contaminant oxidation (leaching) step to prevent any dissolved metals (especially precious metals such as gold) from adsorbing onto carbon in the material. The use of a blinding agent may obviate the need for roasting to separate the precious metal from the carbon.

Thus, in a fifth aspect the present invention provides a process for treating a contaminated sulfidic material having a relatively high carbon content to allow recovery of precious metal in the material, comprising the steps of:

leaching the material in an aqueous solution wherein the metal is leached into solution, whilst carbon in the material is masked to prevent precious metal adsorption thereon; and recovering the precious metal from the solution.

The terminology "relatively high carbon content" refers to a level of carbon present in the sulfidic material typically of about 2-20 wt %.

The carbon can be masked with a blinding agent as defined above. The process of the fifth aspect can otherwise be as defined in the first to fourth aspects.

After precipitating and removing the contaminant and regenerating the multi-valent species to its relatively high oxidation state, the solution is typically recycled to the leaching stage. Because the multi-valent species has been regenerated to its original (pre-leaching) oxidation state it is ready to participate in further oxidation and leaching.

In the process of the third and fourth aspects metal recovery stages can be provided to recover metal leached into solution with the contaminant and/or that is present in from the residual contaminant refined material.

For example, in the case of a double-refractory ore that includes carbon, a metal recovery stage may be required subsequent to the final leaching stage to recover metal present in the residual contaminant refined material that has eg. adsorbed onto the carbon (eg. a precious metal such as gold etc). Also, in the case of a double refractory ore, because the contaminant has been substantially removed from the sulfidic material during leaching, the metal recovery stage may comprise a conventional roasting or smelting process. Optionally chlorine or cyanide leaching may be employed after roasting to recover any remaining metal in the roasted solids material (for example, where the metal is a precious metal such as gold).

Alternatively or additionally, an in-line metal recovery stage may be required prior to (ie. intermediate to contaminant oxidation and precipitation) or subsequent to (ie. intermediate to contaminant precipitation and recycle to the oxidation stage) contaminant precipitation to remove any metal that is leached into solution in the leaching stage. The terminology "in-line" refers to a stage located on the solution recycle circuit. In-line metal recovery typically involves adsorption of the metal in solution onto carbon in a carbon column, typically activated carbon. Alternatively, other metal recovery processes may be employed including ion exchange, solvent extraction, etc.

Typical metals recovered in the process of the third and fourth aspects include precious metals such as gold, silver, platinum or other platinum group metals, the recovery of which metal typically justifies the process economics. However, other economically significant metals may alternatively or additionally be recovered including copper, nickel, zinc, lead etc. In addition, in certain applications of the process of the third and fourth aspects, the contaminant may itself be desirable or necessary to recover. For example, the contaminant may be economically valuable or environmentally harmful, prompting its recovery from the contaminant precipitate (eg. this may be the case for a contaminant such as antimony, bismuth, cadmium etc.). When the contaminant constitutes the "metal" to be recovered, a contaminant recovery stage can additionally or alternatively be provided after contaminant precipitation.

Prior to metal recovery in the process of the third and fourth aspects, a number of material separation stages are typically provided to separate the contaminant refined material from the solution. In this regard, typically after the first leaching stage the solution is subjected to a thickening stage to thicken and separate contaminant refined material from the solution. Typically after the second leaching stage the contaminant refined material is filtered from the solution, however other separation methodologies may be employed such as solid/liquid settling, solution evaporation, centrifugation etc.

Thus, typically the separated solution after each of the first and second leaching stages is passed to contaminant recovery, whereas the separated refined material may need to be passed to metal recovery (eg. in the case of a double-refractory pyrite) or to disposal.

In addition, in the process of the third and fourth aspects, after the contaminant precipitation stage, a contaminant separation stage is typically provided to remove the contaminant from solution prior to recycling the solution to the leaching stage (or prior to an in-line metal recovery stage). In this regard, a solid/liquid separation stage is typically employed after contaminant precipitation, which may be facilitated by filtration or another separation methodology.

BRIEF DESCRIPTION OF THE DRAWINGS

Notwithstanding any other forms which may fall within the scope of the present invention, preferred forms of the invention will now be described, by way of example only, and with reference to the accompanying drawings in which:

FIG. 9 is a graph plotting various second stage (pyrite) leaching solution parameters against time (duration of reaction) for the process of FIGS. 6 & 7.

MODES FOR CARRYING OUT THE INVENTION

Figure 1:
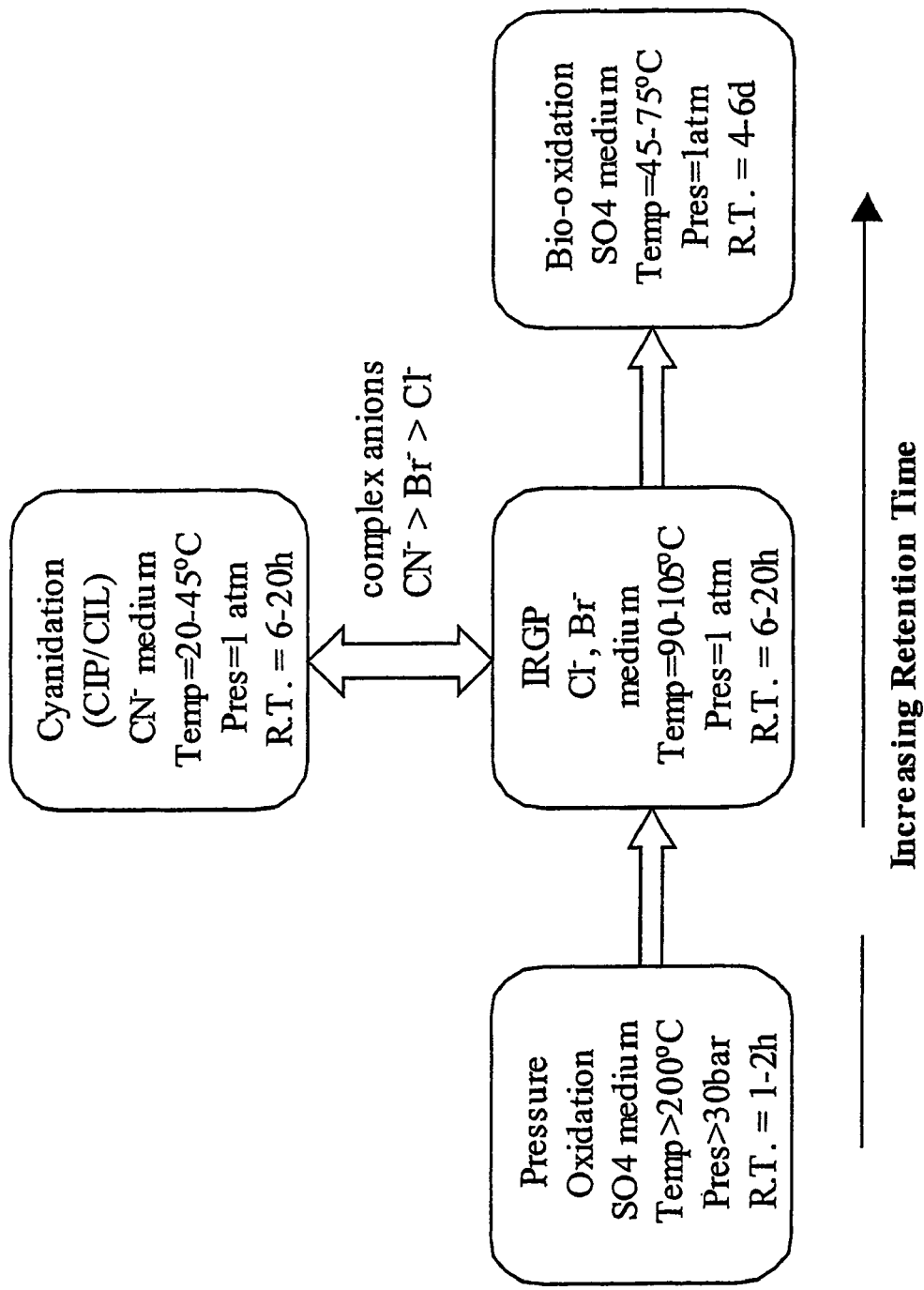
FIG. 1 schematically depicts generalised process representations of the prior art POx and Biox processes, in comparison to a preferred process (IRGP) according to the present invention for recovering a precious metal from a sulfidic material.

Prior to describing preferred processes of the invention by way of detail and example, preferred processes according to the present invention will first be described in overview and in context with the prior art POx and Biox processes by reference to FIG. 1.

Preferred processes according to the present invention are referred to in this detailed description as the Intec Refractory Gold Process (IRGP). These processes were developed as a halide based alternative for the recovery of gold from refractory sulfide mineral deposits. A known treatment of such deposits is generally by way of flotation of ground ore to produce a concentrate, which is subsequently treated to oxidize sulfide minerals predominantly to sulfate, culminating in the extraction of the gold from the oxidation residue using cyanide.

Current commercially available options for the oxidation of sulfide minerals include roasting, pressure oxidation (POx) and bio-oxidation (Biox). The context of the IRGP by comparison to current hydrometallurgical practice (POx and Biox) is schematically depicted in FIG. 1. The IRGP advantageously differs from the hydrometallurgical POx and Biox options in that a halide rather than sulfate medium is employed. Gold is insoluble in sulfate, whereas halides, like cyanide, form strong complexes with gold to facilitate its dissolution and subsequent recovery by adsorption onto activated carbon. As halides are weaker ligands than cyanide an acidic environment (pH<2) and higher solution temperature and potential (Eh) are employed to achieve the same gold extraction efficiencies.

For the treatment of refractory sulfides a halide medium at controlled solution oxidation potentials allowed arsenic and sulfide oxidation and gold dissolution. After the gold laden solution was separated from the oxidised sulfide mineral slurry, the dissolved gold was able to be recovered by adsorption onto activated carbon, which was subsequently burnt, or eluted with cyanide for the ultimate recovery of gold metal by electrowinning. Unlike current commercial practice, the IRGP did not require cyanidation of the oxidation residue for gold extraction, which requires a separate dedicated leach circuit and possibly also the costly requirement for residual cyanide destruction.

There are a number of factors that can render a gold-bearing ore refractory, as shown in the following table:

| Type | Causes of Refractory Characteristics |
| --- | --- |
| Liberation | Physical locking in silicates, sulphides, carbon, etc. |
| Occlusion | Passivation due to formation of a chemical layer. |
| Chemistry | Formation of auriferous compounds e.g. gold tellurides and aurostibnite. |
| Substitution | Elemental replacement by gold in mineral lattice e.g. "solid solution" gold in pyritic ores. |
| Adsorption | Adsorption of dissolved gold by 'active' carbonaceous material in the ore pulp. |

The IRGP was developed specifically to treat concentrates produced from those refractory ores falling into the latter two categories of "substitution" and "adsorption". The major proportion of the world's gold reserves fall into these two categories, which are dominated by iron sulfides such as arsenopyrite and pyrite, occurring either separately or more commonly in combination. The IRGP was also applicable when "active" carbon was also present in the ore.

The IRGP process and chemistry are now described for the treatment of refractory gold concentrates containing the following mineral types:

1. Arsenopyrite
2. Arsenopyrite plus pyrite
3. Arsenopyrite plus pyrite plus carbon.

Arsenopyrite Oxidation Chemistry

The presence of arsenic in refractory gold concentrates is chiefly in the form of arsenopyrite (FeAsS). Gold is typically "locked" in this arsenopyrite principally as a lattice-bound species, often referred to as a solid solution, rather than as native gold. Consequently gold liberation required complete destruction of the arsenopyrite lattice.

Destruction of the arsenopyrite lattice in the IRGP was achieved by chemical oxidation according to the following overall reaction:

$$FeAsS + 2O_2 \rightarrow FeAsO_4 + S \quad (1)$$

The oxygen did not oxidize the arsenopyrite directly, but acted through several intermediate steps, as its solubility in the process liquor was exceedingly low.

The oxygen was supplied directly from air sparged into the leach at atmospheric pressure, and initially was used to generate a soluble oxidant in the form of cupric ion ($Cu^{2+}$) according to the following reaction:

$$2Cu^+ + \tfrac{1}{2}O_2 + 2H^+ \rightarrow 2Cu^{2+} + H_2O \quad (2)$$

This reaction took place at the interface between the air bubbles and the process liquor. The cupric ion then oxidised the arsenopyrite according to the following reaction:

$$FeAsS + 7Cu^{2+} + 4H_2O \rightarrow H_3AsO_4 + Fe^{2+} + S + 5H^+ + 7Cu^+ \quad (3)$$

The ferrous and cuprous reaction products were subsequently oxidised by further air sparging according to reaction (2) and the following reaction:

$$Cu^{2+} + Fe^{2+} \rightarrow Cu^+ + Fe^{3+} \quad (4)$$

In the presence of ferric ion, the arsenic acid readily formed insoluble ferric arsenate according to the following reaction:

$$H_3AsO_4 + Fe^{3+} \rightarrow FeAsO_4 + 3H^+ \quad (5)$$

Ferric arsenate was able to form in the high chloride electrolyte and, under the operating conditions used in the IRGP, was typically crystalline and stable in the environment, enabling its easy separation.

The action of the $Cu^{2+}/Cu^+$ couple was supplemented by the $Fe^{3+}/Fe^{2+}$ couple, as a small background concentration of iron was always present in the process liquor. The potential achievable under the influence of the $Cu^{2+}$ and $Fe^{3+}$ was in the region of 850 mV (versus SHE) in the presence of oxygen. This potential was sufficient for the dissolution of gold, due to the stabilisation of the gold by the formation of a chloride complex according to the following reaction:

$$3Cu^{2+} + Au + 4Cl^- \rightarrow AuCl_4^- + 3Cu^+ \quad (6)$$

Where bromide was present in the process liquor (eg. if deliberately added), a gold-bromide complex was also formed according to the following reaction:

$$3Cu^{2+} + Au + 4Br^- \rightarrow AuBr_4^- + 3Cu^+$$

The oxidation was carried out at a temperature of 90-95° C. in an 8M chloride electrolyte containing 20-40 g/l $Cu^{2+}$ ion plus 2-5 g/l $Fe^{3+}$ ion.

Pyrite Oxidation Chemistry

The oxidation of pyrite ($FeS_2$) in the IRGP was achieved via the same series of intermediate reactions as employed for arsenopyrite oxidation according to the following overall reaction:

$$4FeS_2 + 15O_2 + 2H_2O \rightarrow 8SO_4^{2-} + 4Fe^{3+} + 4H^+ \quad (7)$$

It was noted that the pyritic sulfur was oxidised all the way to sulfate in contrast to the arsenopyritic sulfur that was only oxidised to the elemental state.

Pyrite is more refractory than arsenopyrite, and hence a finer grind size was employed to achieve acceptable reaction kinetics as explained below. However, individual pyrite samples exhibited variable reactivity that was thought to be influenced by arsenic substitution for a portion of the sulfur in the crystal lattice. Such pyrite is often termed arsenical pyrite and, the higher the arsenic contamination, the more the pyrite reactivity approached that of true arsenopyrite, with an As/S ratio of one.

The reaction proceeded through the $Cu^{2+}/Cu^+$ couple as for arsenopyrite at a temperature of 90-95° C. in the same liquor used for arsenopyrite oxidation according to the following reaction:

$$FeS_2 + 7Cu^{2+} + 4H_2O \rightarrow SO_4^{2-} + Fe^{2+} + 8H^+ + 7Cu^+ \quad (8)$$

The $Cu^+$ and $Fe^{2+}$ were oxidised by further oxygen sparging according to reactions (2) and (4). The ferric sulfate formed was precipitated as hematite and gypsum by the addition of limestone at a pH of approximately 1-1.5 according to the following reaction:

$$4SO_4^{2-} + 2Fe^{3+} + 2H^+ + 4CaCO_3 \rightarrow Fe_2O_3 + 4CaSO_4 + 4CO_2H_2O \quad (9)$$

Limestone addition was controlled to maintain soluble iron in the range 2-5 g/l, which prevented the precipitation and loss to the leach residue of cupric copper.

Concentrate Grind Size

Concentrates for use in the IRGP were typically received in the size range of 80% less than 70-100 microns. Tests indicated that reaction kinetics were significantly enhanced when the concentrates were reground to a finer size (dependent on the characteristics of each individual concentrate), and in the first process mode (described below) regrinding was typically employed. Where arsenopyrite was the sole gold-bearing mineral, a size of 80% less than 30-40 microns proved adequate to achieve good gold extraction and an acceptable leach retention time.

Where gold was locked in pyrite, the grind size principally depended on the reactivity of the pyrite which, as previously explained, varied greatly. For a highly active pyrite, the grind employed for arsenopyrite was used, but more refractory pyrite examples required finer grinding. This sometimes extended to an ultra-fine grind with 80% less than 6-10 microns in a more extreme refractory case. The inventors also noted that ultra-fine grinding technology has developed over the last 10 years to the point where many ultra-fine grinding mills are successfully operating at mines around the world.

Gold Recovers

The gold-bearing leach solution was passed through columns containing activated carbon onto which the gold was adsorbed. Retention time for gold adsorption was 10-15 minutes, which was similar to conventional practice for cyanide systems. Gold loading onto the carbon was typically 2-5% w/w due to the relatively high gold concentrations in the solutions (typically 10-100 mg/l), as a consequence of the typically high gold grade of the concentrate. Gold recovery at such loading was via destruction of the carbon by combustion in a kiln. At lower loading, elution with cyanide followed by reactivation of carbon was more economic.

Impurity Management

In addition to any major contaminants (such as arsenic, antimony etc), the presence of impurities in the feed concentrate (such as Cd, Mn, Mg, etc.) had no detrimental effect on either the leaching or precipitation operations. Nevertheless, a method for the management of impurities was employed to prevent their build-up in the process solution over time. This was achieved via precipitation from a bleed of the regenerated cupric solution with the purified brine returned to the process. Importantly the IRGP did not generate any liquid effluents and all impurities were removed as solid by-products.

Limestone was added to the bleed to adjust the pH to 3.5, precipitating residual iron and copper, which were removed by filtration and recycled to the leach. Impurities, such as Cd, Mn and Mg, were then removed via slaked lime addition at pH 9 to form insoluble oxides that were recovered by filtration for disposal.

In the context of process equipment the IRGP was similar to Biox processes in that atmospheric pressure was used, but retention time was advantageously lower, typically in the range 6-20 hours. With pyrite oxidation a leach temperature higher than Biox was employed, but avoidance of an oxygen plant (as used for Pox) was achieved where the concentrate fed to the process was finely ground, typically to an ultra-fine level of eg. less than 10 μm. Materials of construction of process apparatus were fibre-reinforced plastic, rubber-lined steel and titanium.

Arsenopyrite Plus Pyrite Plus Carbon (Double Refractory)

The impact of carbon in the processing of gold concentrates was largely a function of its grade and activity. At the lower range of carbon content, either organic additives (blinding agents) were used to inhibit gold adsorption, or activated carbon was added to the leach to preferentially adsorb gold (CIL—carbon in leach). Thus, in these instances the oxidation of the arsenopyrite was as described previously.

However, when the content of carbon started to exceed 3 to 5%, the effectiveness of inhibition or CIL was greatly reduced as so-called "preg-robbing" of gold increased. In this instance the destruction of carbon by roasting has been the main treatment option practiced in the prior art. This is a relatively complex process, as gold extraction from the resulting calcine is affected by the roasting conditions. Further, the optimal conditions for pyrite roasting differ from those of arsenopyrite, necessitating a two stage roasting process.

The use of the IRGP prior to roasting selectively leached arsenic and sulfur to simplify subsequent roasting, which in this instance became a simpler single-stage process. Further, the removal of arsenic and sulfur reduced the duty for off-gas scrubbing from roaster operations, because $As_2O_3$ and $SO_2$ were greatly reduced. The impact was thus one of significantly reduced capital and operating costs in the roasting step.

First & Second Process Modes

When treating refractory sulfides, in a first process mode according to the invention, the use of a halide medium at certain solution oxidation potentials allowed sulfide oxidation to be performed concurrently with gold dissolution (a so-called "all-in-one" process). In a second process mode according to the invention, the use of the halide medium with different solution parameters allowed contaminant oxidation (eg. arsenic etc) to take place prior to sulfide oxidation, typically with some gold dissolution, with contaminant separation and further gold recovery being performed separately and subsequently. The first process mode according to the invention will now be described in detail and thereafter the second process mode according to the invention will be described in detail.

First Process Mode

In describing the first process mode, reference will be made to FIGS. 2 to 4 and Examples 1 to 3.

Figure 2:
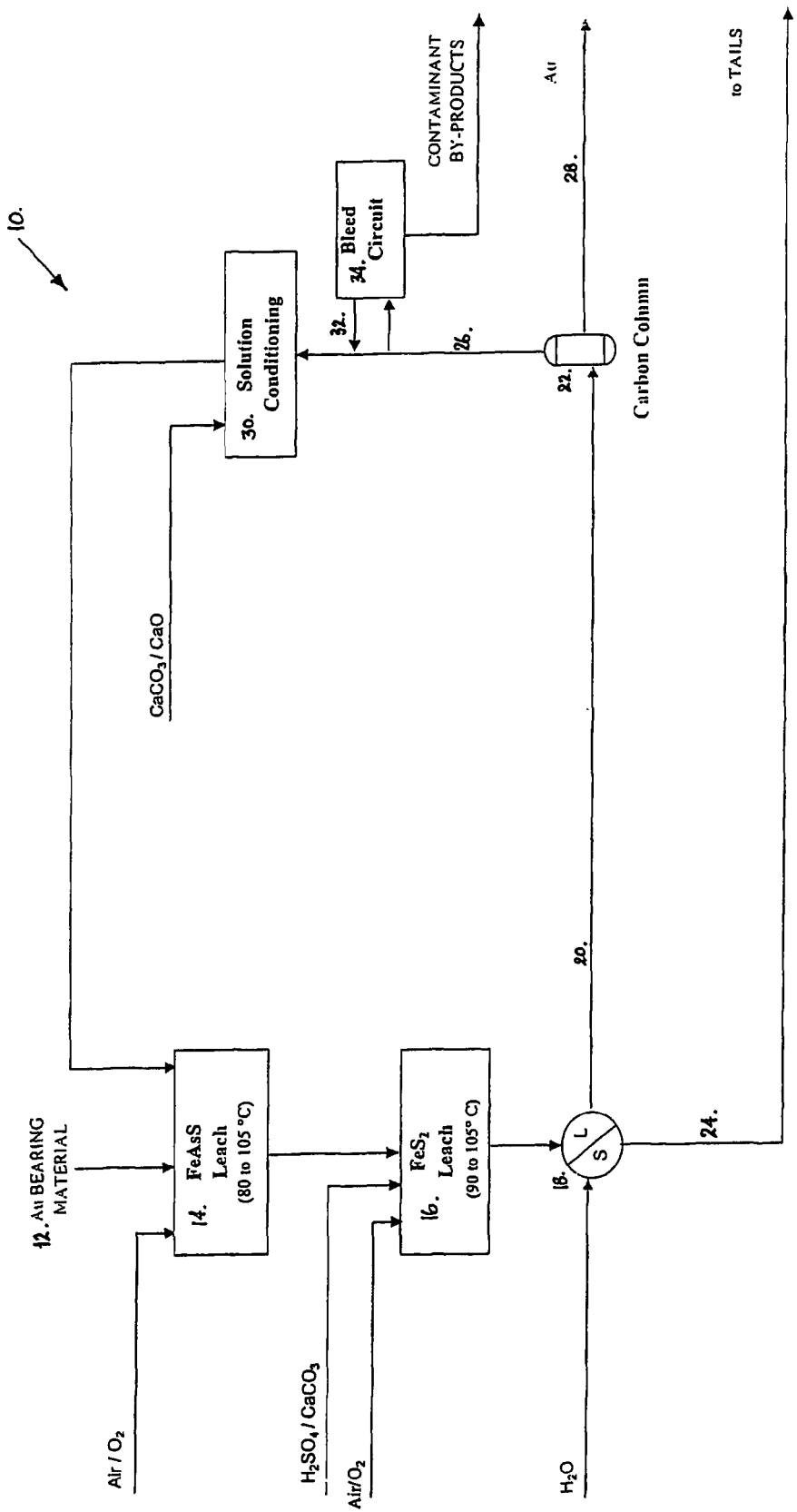
FIG. 2 schematically depicts a generalised process flow diagram for a first mode for the recovery of a precious metal (gold) from a contaminated sulfidic material (arsenopyrite—FeAsS)

Referring now to FIG. 2 a single refractory pyritic gold recovery process 10 is schematically depicted. A precious metal concentrate 12 for feeding to the process is prepared by mining, milling and then flotation of a sulfidic ore. The concentrate is typically a gold-containing arsenopyrite (where it has a high carbon content it becomes double refractory). The concentrate is ground in a special ball mill, typically to an ultra-fine level of less than 10 μm. The ground concentrate is then fed to a first leaching stage in the form of arsenopyrite leaching stage 14.

In the arsenopyrite leaching process 14 an acidic environment is maintained (preferably less than pH 1, as leaching of arsenopyrite is enhanced at low solution pH). The acid environment can be achieved solely by the solution recycle, or a non-contaminating acid may also be added (such as sulfuric or hydrochloric acid). The leaching solution Eh is typically maintained at greater than 0.4 volts to promote oxidation of the arsenopyritic component of the material and solubilisation of gold. The leaching temperature is maintained at around 80-95° C.

The leached material is then fed a second pyrite leaching stage 16 where an oxidant (such as oxygen, air, chlorine, hydrogen peroxide etc) is added to raise the solution oxidation potential and thereby oxidise the pyrite. To maintain the arsenic in a precipitated form in the second leaching stage acid (such as sulfuric acid) or base (such as calcium carbonate) addition may be required to maintain the solution pH above about 0.2.

The process solution is typically an aqueous cupric chloride solution, having a chloride concentration of 8 moles/liter. In both the arsenic and pyrite leaching stages the cupric ion oxidises the sulfidic material and is reduced to cuprous ion (equations (2) and (8)). The cupric ion is also regenerated in the acidic oxidising environment (equations (3) and (9)). Thus, in the process, copper acts as an electron transfer agent, existing as a $Cu^{2+}/Cu^+$ couple. Other agents can perform this function, including iron, cobalt, manganese, vanadium, etc.

Where the sulfidic material has a high carbon content (eg. up to 3-5 wt %) a masking surfactant may be added to the solution at stages 14 and 16 to prevent adsorption onto carbon of any gold (or other precious metal) leached into the solution. The surfactant is typically an organic blinding agent such as kerosene, a phenol ether etc. Alternatively activated carbon can be added to preferentially adsorb the gold for subsequent removal.

In the first mode, in arsenopyrite leaching stage 14 the present inventors have found that at a controlled pH of less than 1 but above that at which arsenic solubilises, at a controlled relatively modest Eh of about 0.7-0.8 volts (versus SHE), and at relatively low temperatures (80-95° C.) the material can be leached and the gold solubilised, without oxidising pyritic sulfide to sulfate.

The oxidising conditions employed in the pyrite leaching stage 16 are more severe than the arsenic leaching stage 14. In this regard an oxidant is sparged into the solution so that the oxidation potential Eh is increased to approximately 0.85 volts. In addition, the temperature of the solution in the second leaching stage may need to be raised to around 90-105° C. Again, in the first mode the pH of the solution in the second leaching stage is again controlled at less than pH 1 but above that at which arsenic solubilises.

Because acid is consumed in the second stage leaching process (ie. as Cu(II) is regenerated) it may be necessary to periodically or continuously supply acid to the solution in leaching stage 16, such as sulphuric acid, hydrochloric acid or another acid that does not interfere with the process chemistry. However, the top-up of acid depends on whether sufficient sulfuric acid is produced by the leaching of pyrite. In addition, the pH is controlled in the leaching stage 16 through the addition of calcium carbonate to prevent the solubilising of arsenic.

In leaching stage 16 sulfide is oxidised through to sulfate and iron is leached into solution as Fe(III) (equation (1)) and typically any remaining gold in the pyrite (or other precious metal) is solubilised. The inventors surprisingly observed that an oxidation potential was achievable under the influence of the $Cu^{2+}$ and $Fe^{3+}$ in the region of 850 mV (versus SHE) in a halide solution in the presence of oxygen. This potential was sufficient for the dissolution of gold in the 8M $Cl^-$ medium used, due to the formation of a gold-chloride complex.

The resultant solids slurry from pyrite leaching stage 16 is passed to a solid-liquid separation stage 18, where typically the solids are filtered from the solution using known filtering apparatus. The resulting liquid filtrate 20 is passed to an in-line precious metal recovery stage 22, whereas the filtered solids 24 are disposed of as tails. Top-up water is added at stage 18 to compensate for that lost with the tails.

The metal recovery stage 22 comprises one or more columns filled with activated carbon through which the solution is passed upwardly, such as in a fluidised bed arrangement. The solubilised gold (or other precious metal) in the solution adsorbs onto the carbon, whilst an overflow liquid stream 26 passes out of the column and is recycled to the leaching stage 14. The activated carbon bearing gold is then removed or treated periodically and passed as a gold product stream 28 to a gold recovery process (eg. by burning the carbon product or eluting the carbon column with cyanide solution).

The overflow liquid stream 26 is recycled to the leaching stage 14 via an iron precipitation stage in the form of solution conditioning stage 30. In stage 30 the soluble ferric sulfate from the pyrite oxidation stage 16 is precipitated to remove sulfur and iron from the process by the addition of limestone and calcium carbonate to form hematite and gypsum (equation (6)). Limestone addition is controlled to maintain approximately 2 g/l iron in solution, to prevent the precipitation of cupric copper. The hematite/gypsum slurry is filtered and the residue washed, prior to disposal to tailings. Thereafter, the solution is recycled to stage 14.

To prevent contaminant build up in the overall process, a proportion 32 of the stream 26 is recycled as a bleed circuit 34 to separate out contaminants such as Mn, Cd, Ni, Co etc (eg. through a controlled precipitation by raising of bleed solution pH).

FIRST PROCESS MODE EXAMPLES

Now that an optimal process flowpath has been described, preferred examples illustrating the first process mode according to the present invention will be described.

Example 1

As a preliminary evaluation, the gold extraction from a first concentrate was conducted in three different steps: arseno-pyrite leach, a pyrite leach 1 and a pyrite leach 2. The following laboratory test reports describe the procedure and results of these three steps. CON1 01 refers to an arseno-pyrite leach and pyrite oxidation 1, and CON1 02 refers to a pyrite oxidation 2. The first concentrate was milled to P80=30µ and subjected to an As leach followed by pyrite oxidation.

Aim

The aim was to apply the IRGP to a single refractory Au concentrate. An ore sample was provided to a metallurgical lab for milling and concentration.

Procedure

This experiment was conducted in two parts and was carried out in a 7.5 L titanium insulated tank. The first part, the As leach, used a conventional mixer. The second part, oxidation of the pyrite, used a flat blade turbine and sparger.

Part 1: As Leach

In a 7.5 L titanium reactor fitted with a "propeller" agitator, 3.5 L of neutral brine was prepared with 200 gpl NaCl, 50 gpl $CaCl_2$ and pH<0.5. 5 L "boost" solution was also prepared with 200 gpl NaCl, 50 gpl of $CaCl_2$ and 75 gpl Cu from $CuCl_2$ and pH<0.5. As required, Eh was adjusted to between 580 and 600 mV with the addition of a few grams of copper dendrites. The boost solution was maintained at 80° C.

After heating the leach reactor to 105° C., the equivalent of 300 gr of dry concentrate was added to the brine. After 15 minutes, as required, concentrated HCl was added to the suspension to adjust the pH<0.5 and t=0 sample was taken. All additions of acid were noted (time, volume of addition, volume in leach tank).

Eh and pH were measured, the boost solution was added slowly at the rate of 2.5 l/hr, monitoring the Eh in order not to exceed 530 mV. Samples of solution were taken every 30 minutes for As, Fe, Cu analysis. Eh & pH were monitored every 30 minutes.

When an Eh of 530 mV was reached and was stable, the As leach was considered as complete. The slurry was filtered. The cake was washed twice with hot brine (50 gpl NaCl and pH<1.0) followed with hot water washes until the filtrate was clear. The cake was dried in an oven overnight. The cake was analysed for $S_{(T)}$, $S_{(E)}$, As, Fe, Au and C.

Part 2: Pyrite Oxidation

A 7.5 L reactor was equipped with a flat blade turbine agitator and a titanium sparger tube. 10 liters of brine solution was prepared in the leach tank with 200 gpl NaCl, 50 gpl of $CaCl_2$ and 75 gpl Cu from $CuCl_2$ and pH<0.5 with addition of concentrated HCl 8.8 molar. The solution was heated to 105° C., t=0 sample was taken and the dry cake produced in part 1 As leach was introduced into the tank. After 15 minutes, a sample of solution was taken for Eh and pH measurement. Technical HCl was added as required to bring the pH<0.5.

Oxygen was introduced at the rate of 2 l/min; Eh and pH were monitored every 30 minutes, and samples were taken every hour for Fe, As, Cu analysis. When the Eh was stable above 600 mV for 3 hours and the Fe in solution did not change, the leach was considered as complete. The slurry was filtered. The cake was washed twice with hot brine (50 gpl NaCl and pH<1.0) followed with hot water washes until the filtrate was clear. The cake was dried in an oven overnight. The cake was analysed for $S_{(T)}$, $S_{(E)}$, As, Fe, Au and C.

Example 2

An additional pyrite oxidation of the concentrate residue from Example 1 was conducted.

Aim

The analysis of the data and the residue from Example 1 showed that the pyrite oxidation was not completed when the experiment was terminated. This procedure with an improved brine formula attempted to increase Au extraction using oxygen to oxidise the pyrite.

Outcome

The second pyrite oxidation improved metals extraction as shown in the following table (based on independent analysis):

| Elements | Oxidation 1 | Oxidation 2 |
| --- | --- | --- |
| As | 79.6% | 92.4% |
| Fe | 72.2% | 97.1% |
| Au | 68.7% | 93.3% |

Procedure

A 7.5 L reactor was equipped with a flat blade turbine agitator and a titanium sparger. 5 liters of brine solution was prepared in the leach tank with 100 gpl NaCl, 250 gpl of $CaCl_2$ and 100 gpl Cu from $CuCl_2$ and pH<0.5 with the addition of concentrated HCl. The solution was heated to 105° C., t=0 sample is taken and the dry cake produced in Example 1. As leach/Pyrite oxidation was introduced into the tank. After 15 minutes, a sample of solution was taken for Eh and pH measurement. Concentrated HCl was added if required to bring the pH<0.5.

Oxygen was introduced at the rate of 2 l/min, Eh and pH were monitored every 30 minutes and samples were taken every hour for Fe, As, Cu analysis. When the Eh was stable above 600 mV for 3 hours and the Fe in solution did not change, the oxygen flow was interrupted and the Eh monitored. When the Eh stayed above 600 mV, the pyrite oxidation was considered completed.

The slurry was filtered. The cake was washed twice with hot brine (50 gpl NaCl and pH<1.0) followed with hot water washes until the filtrate was clear. The cake was dried in the oven overnight. The cake was analysed for $S_{(T)}$, $S_{(E)}$, As, Fe, Au and C.

Results

The following results were obtained from the experiments of Examples 1 & 2.

|  |  | Duration hr | T ° C. | Eh mV | pH | Fe Cum g | As Cum g | Fe g/l | As g/l |
| --- | --- | --- | --- | --- | --- | --- | --- | --- | --- |
| Ars |  | 0.0 | 105 | #N/A |  |  |  |  |  |
|  |  | 0.3 | 105 | #N/A | 0.4 | 2.5 | 0.0 | 2.5 | 0.00 |
|  |  | 0.7 | 105 | 505 | <0.5 | 2.8 | 0.00 | 2.8 | 0.00 |
|  |  | 1.2 | 105 | 512 | <0.5 | 3.3 | 0.00 | 3.3 | 0.00 |
|  |  | 1.6 | 105 | 518 | <0.5 | 3.6 | 0.00 | 3.6 | 0.00 |
|  |  | 2.1 | 105 | 527 | <0.5 | 4.0 | 4.16 | 4.0 | 0.42 |
|  |  | 2.4 | 105 | 525 | <0.5 | 4.3 | 4.11 | 4.3 | 0.41 |
|  |  | 2.9 | 105 | 528 | <0.5 | 4.4 | 4.12 | 4.4 | 0.41 |
|  |  | 3.4 | 105 | 531 | 0.2 | 5.0 | 4.20 | 5.0 | 0.42 |
| Pyrite Oxidation 1 | 0.25 | 3.7 | 105 | 580 | 0.4 | 6.0 | 4.20 | 1.0 | 0.00 |
|  | 1.25 | 4.7 |  | 602 | 0.5 | 7.8 | 4.20 | 2.9 | 0.00 |
|  | 2.25 | 5.7 | 105 | 606 | 0.6 | 9.6 | 4.20 | 4.6 | 0.00 |
|  | 3.25 | 6.7 | 105 | 597 | 0.5 | 12.0 | 9.20 | 7.0 | 0.50 |
|  | 4.25 | 7.7 | 105 | 602 | 0.5 | 15.0 | 9.20 | 10.0 | 0.50 |
|  | 5.25 | 8.7 |  | 607 | 0.4 | 17.0 | 9.70 | 12.0 | 0.55 |
|  | 6.25 | 9.7 | 105 | 606 | 0.5 | 18.5 | 9.20 | 13.5 | 0.50 |
|  | 6.75 | 10.2 | 105 | 620 | 0.5 | 18.5 | 9.20 | 13.5 | 0.50 |
|  | 9.75 | 13.2 | 105 | 609 | 0.7 | 21.2 | 11.20 | 16.3 | 0.70 |
|  | 10.75 | 14.2 | 100 | 616 | 0.7 | 22.7 | 11.70 | 17.8 | 0.75 |
|  | 11.75 | 15.2 | 100 | 616 | 0.6 | 24.7 | 12.20 | 19.8 | 0.80 |
|  | 12.75 | 16.2 | 105 | 612 | 0.6 | 26.2 | 13.20 | 21.3 | 0.90 |
|  | 13.75 | 17.2 | 105 | 623 | 0.6 | 26.7 | 13.20 | 21.8 | 0.90 |
|  | 15.75 | 19.2 | 105 | 625 | 0.6 | 28.5 | 13.20 | 23.5 | 0.90 |
| P | 0.75 | 19.9 | 105 | 661 | 0.2 | 29.6 | 13.20 | 0.5 | 0.00 |
|  | 1.75 | 20.9 | 105 | 661 | 0.2 | 31.7 | 13.20 | 1.5 | 0.00 |
|  | 2.75 | 21.9 | 105 | 661 | 0.3 | 32.8 | 13.20 | 2.0 | 0.00 |
|  | 3.75 | 22.9 | 105 | 674 | 0.3 | 33.9 | 13.20 | 2.5 | 0.00 |
|  | 4.75 | 23.9 | 105 | 664 | 0.5 | 36.1 | 13.20 | 3.5 | 0.00 |
|  | 5.75 | 24.9 | 104 | 665 | 0.4 | 37.2 | 13.20 | 4.0 | 0.00 |
|  | 7.25 | 26.4 | 102 | 670 | 0.4 | 38.3 | 13.20 | 4.5 | 0.00 |
|  | 8.25 | 27.4 | 104 | 675 | 0.4 | 39.4 | 13.20 | 5.0 | 0.00 |

-continued

| Duration hr | T °C. | Eh mV | pH | Fe Cum g | As Cum g | Fe g/l | As g/l |
|---|---|---|---|---|---|---|---|
| 9.25 | 28.4 | 103 | 673 | 0.3 | 39.4 | 13.20 | 5.0 | 0.00 |
| 10.25 | 29.4 | 103 | 671 | 0.4 | 40.5 | 13.20 | 5.5 | 0.00 |
| 12.25 | 31.4 | 105 | 669 | 0.7 | 41.6 | 13.20 | 6.0 | 0.00 |
| 13.25 | 32.4 | 105 | 673 | 0.7 | 41.6 | 13.20 | 6.0 | 0.00 |
| 13.75 | 32.9 | 105 | 664 | 0.8 | 41.6 | 13.20 | 6.0 | 0.00 |

Figure 3:
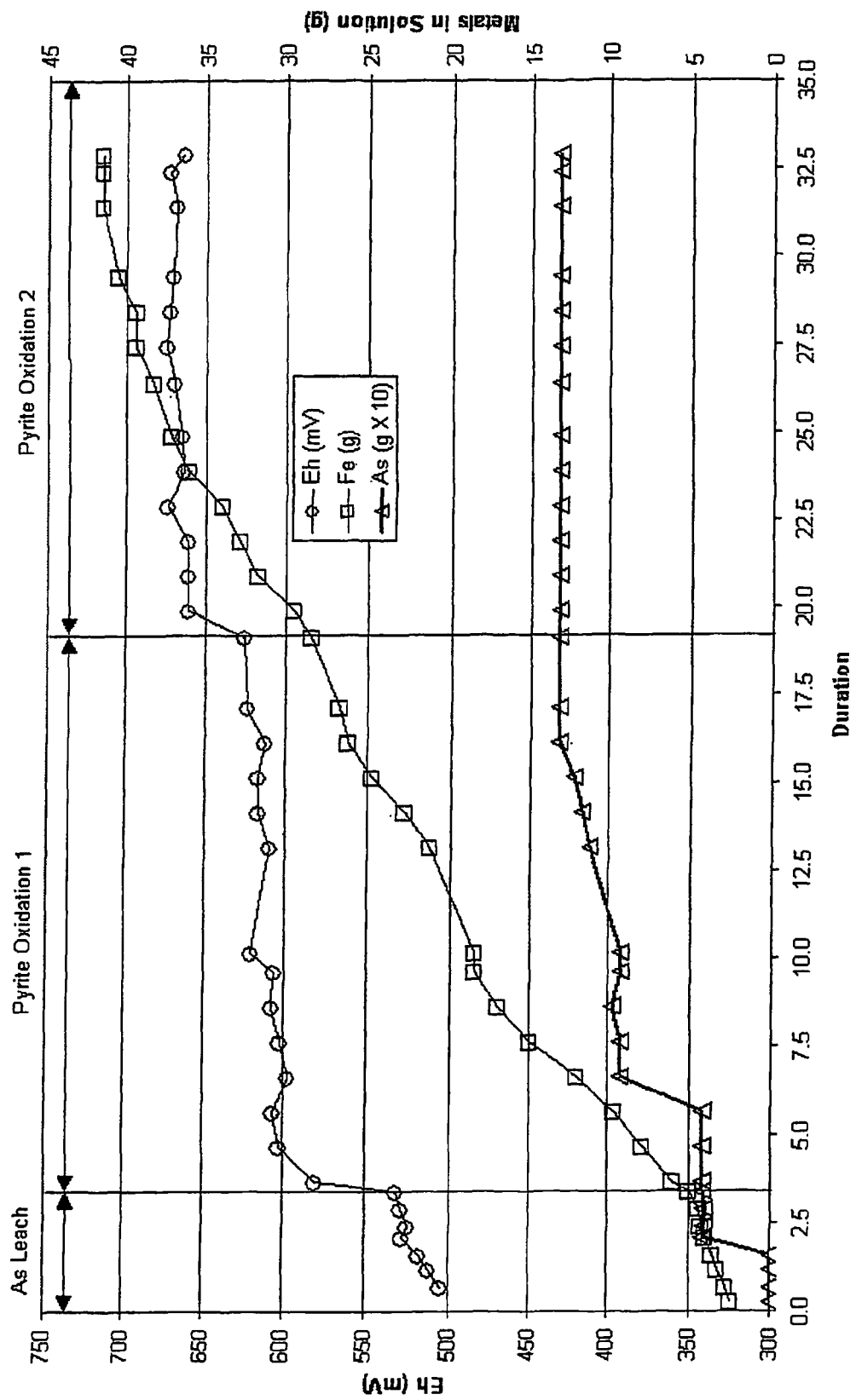
FIGS. 3 & 4 plot gold and iron extraction, and solution Eh against time for various stages of the IRGP.

The results of gold extraction are displayed in FIG. 3.

Example 3

In this experiment, the gold extraction from a second concentrate was achieved in three consecutive steps: step 1 arseno-pyrite and pyrite leach, step 2 pyrite leach with oxygen, and step 3 pyrite leach with chlorine.

Aim

Following a scouting experiment on As leach, this procedure aimed to treat the second concentrate in an "all-in-one" process with a $CaCl_2$ 250 g/l and Cu 100 g/l brine. The solid loading was set at 200 g/l.

Outcome

The chlorine oxidation improved Au extraction as shown in the following table (based on external analysis):

|  | Au Extraction (cumulative) |
|---|---|
| Air + Oxygen | 59% |
| Chlorine | 87% |
| Overall | 95% |

Procedure

The procedure was carried out in a 7.5 L reactor equipped with a turbine agitator. 5 l of brine was prepared with the following formula: NaCl 100 g/l, $CaCl_2$ 250 g/l and Cu 100 g/l and pH was adjusted to <0.5 with the addition of concentrated HCl.

Part 1: Arseno-Pyrite Leach

With the agitator rpm at 90%, the brine was heated to 90° C. A sample of solution was taken for future reference. 1,000 g of equivalent dry "as-received" concentrate (P80 around 37μ) was added to the brine. A sample t=0 was taken, and after 15 minutes as Eh & pH were recorded.

Air was introduced into the reactor at the rate of 2 l/min. Eh, pH were monitored every 30 minutes as a solution sample was taken for As, Fe analysis. When Eh and Fe in solution were stable, the airflow was interrupted. If the Eh dropped by more than 20 mV, the air introduction was resumed for 2 hours. When the Eh did not drop by more than 20 mV, a solid sample of approximately 100 g was taken and a switch was made from air to oxygen.

Part 2: Pyrite Oxidation

The temperature was increased to 105° C. Sample and measurement frequency was changed to a 1-hour interval. Oxygen was introduced underneath the turbine agitator at the rate of 2 l/min. When the Eh and Fe in solution were stable, the oxygen was interrupted. If the Eh dropped by more than 20 mV, the oxygen introduction was resumed for 2 hours. When the Eh did not drop by more than 20 mV, the procedure was considered complete.

The suspension was filtered, the cake washed twice with acidic brine followed by hot water until a clear filtrate was obtained. The washed cake was dried and weighed. The residue was analysed for As, Fe, Cu, elemental S, total S and Au. The last solution sample was also analysed for Au.

Part 3: Pyrite Chlorination

In order to improve Au extraction, the experiment was extended with a pyrite chlorination using hypochlorite as the source of chlorine. The residue from the pyrite oxidation with oxygen was introduced in 4 liters of brine with the same composition as above. The temperature was raised above 100° C. and 50 g of hypochlorite was added every period of 30 minutes. Fe concentration was monitored. When Fe concentration did not increase after hypochlorite addition and the Eh was stable, the experiment was considered complete.

The suspension was filtered, the cake washed twice with acidic brine followed by hot water until a clear filtrate was obtained. The washed cake was dried and weighed. The residue was analysed for As, Fe, Cu, elemental S, total S and Au. The last solution sample was also analysed for Au.

Results

|  | Duration (hr) | Eh mV | pH | Fe g/l | Tot Fe g |
|---|---|---|---|---|---|
| Air | 1.1 | 464 | 0.41 | 11.2 | 56.0 g |
|  | 2.0 | 479 | 0.36 | 18.9 | 94.5 g |
|  | 3.0 | 470 | 0.23 | 20.3 | 101.5 g |
|  | 4.0 | 477 | 0.49 | 19.8 | 99.0 g |
|  | 5.0 | 473 | 0.49 | 18.9 | 94.5 g |
|  | 6.5 | 473 | 0.41 | 20.2 | 101.0 g |
|  | 7.5 | 472 | 0.53 | 22.4 | 112.0 g |
|  | 8.5 | 474 | 0.05 | 22.0 | 105.6 g |
|  | 9.5 | 473 | 0.53 | 20.0 | 100.0 g |
|  | 10.5 | 482 | 0.61 | 20.4 | 112.2 g |
|  | 12.0 | 494 | 0.38 | 21.4 | 117.7 g |
|  | 13.0 | 485 | 0.71 | 21.0 | 115.5 g |
|  | 14.0 | 492 | 0.65 | 20.3 | 111.7 g |
|  | 15.0 | 491 | 0.71 | 22.0 | 121.0 g |
|  | 17.0 | 500 | 0.22 | 23.0 | 124.2 g |
|  | 18.0 | 501 | 0.52 | 20.6 | 109.2 g |
|  | 21.0 | 517 | 0.15 | 23.3 | 121.2 g |
| Oxygen | 22.5 | 522 | 0.59 | 21.3 | 106.5 g |
|  | 23.5 | 537 | 0.64 | 18.7 | 93.5 g |
|  | 24.5 | 552 | 0.64 | 16.3 | 81.5 g |
|  | 26.0 | 571 | 0.86 | 14.3 | 71.5 g |
|  | 27.0 | 613 | 0.69 | 14.8 | 74.0 g |
|  | 28.0 | 645 | 0.73 | 15.8 | 79.0 g |
| Hypochlorite | 28.5 | 630 | 0.77 | 16.2 | 164.8 g |
|  | 31.0 | 661 | 0.35 | 17.7 | 172.7 g |
|  | 32.5 | 660 | 0.40 | 17.8 | 173.2 g |
|  | 33.5 | 691 | 0.10 | 18.0 | 174.3 g |
|  | 34.5 | 667 | <0.1 | 21.7 | 193.9 g |
|  | 35.5 | 664 | <0.1 | 21.3 | 191.8 g |
|  | 37.0 | 667 | <0.1 | 21.7 | 193.9 g |

-continued

| Duration (hr) | Eh mV | pH | Fe g/l | Tot Fe g |
|---|---|---|---|---|
| 39.0 | 684 | #N/A | 23.5 | 203.4 g |
| 40.0 | #N/A | #N/A | 21.3 | 191.8 g |

Figure 4:
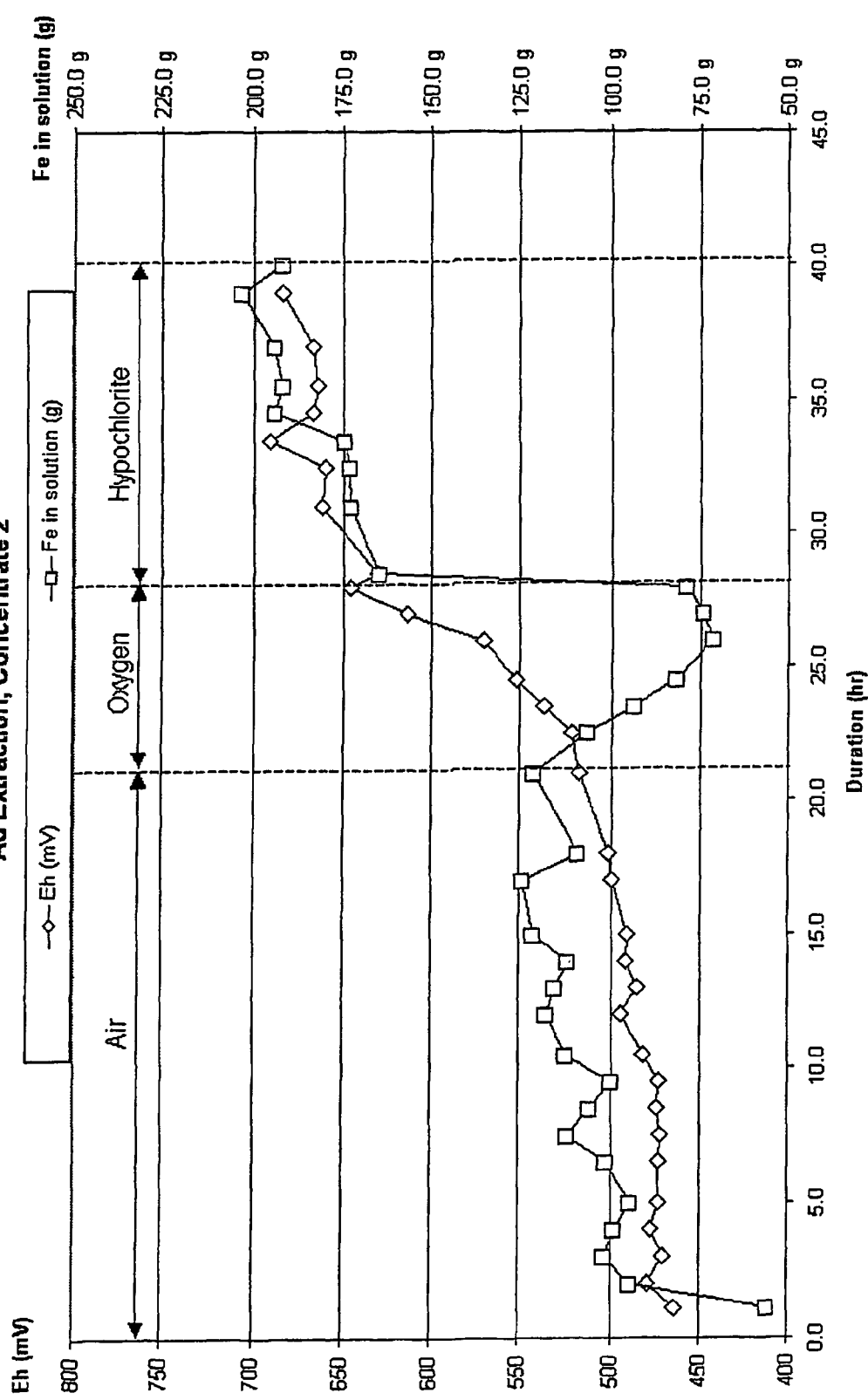

The results of gold extraction are displayed in FIG. 4.

Second Process Mode

Prior to describing the second process mode by way of detail and example, the second process mode will be described in overview with reference to FIG. 5.

Figure 5:
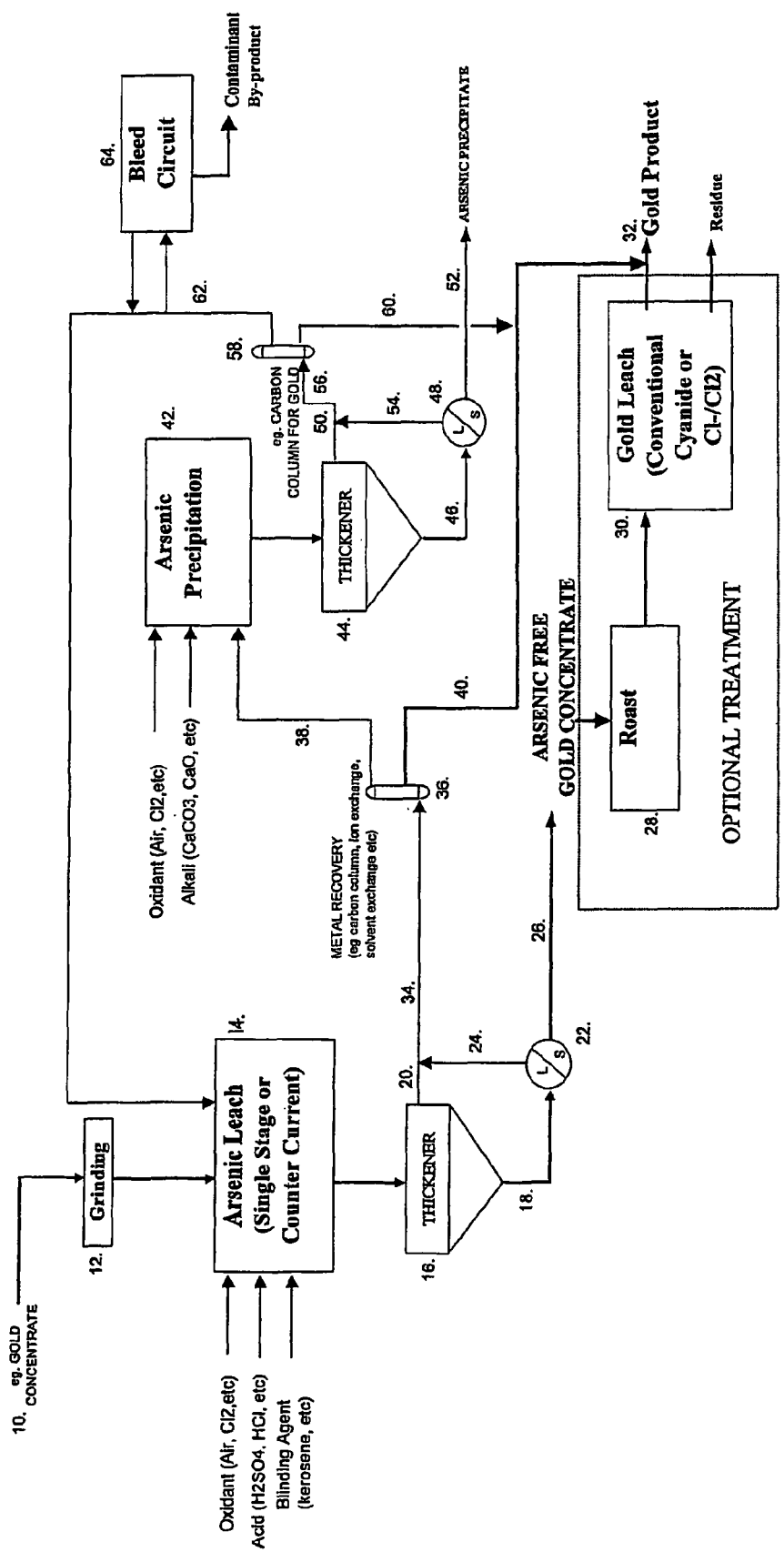
FIG. 5 schematically depicts a generalised process flow diagram for a second mode illustrating removal of a contaminant from a sulfidic material with associated recovery of precious metal from the sulfidic material.

In FIG. 5, a precious metal concentrate 10 for feeding to the process is prepared by mining, milling and then flotation of a sulfidic ore. In the second process mode the concentrate could be a gold-containing arsenopyrite of high carbon content (eg. 2 to 20 wt % carbon) or have low or no carbon content (eg less than 2 wt %). The concentrate is ground in a ball mill 12 and is then fed to a contaminant oxidation stage in the form of arsenic leaching process 14.

The preferred arsenic leaching process is described below in greater detail with reference to FIGS. 6 & 7 and Examples 11 & 12. Leaching may be conducted in a single stage (eg. having one or more processing units, vessels or tanks), but typically is conducted in a multi (two) stage process. Each stage can have one or more processing units, vessels or tanks operated in a co-current or countercurrent leaching configuration, and employing over and underflows (as is known).

In either case, in the leaching process 14 a highly acidic environment is maintained (preferably less than pH 1, as leaching of arsenic from arsenopyrite is favoured by low solution pH). The acid environment can be achieved solely by the oxidation of the sulfidic material (eg. where sulfur in the material is oxidised in solution to sulfate) and/or a non-contaminating acid may be added (such as sulfuric or hydrochloric acid).

Also, in the second process mode the leaching solution Eh is typically maintained at greater than 0.4 volts (see FIG. 8) to solubilise the contaminant (eg. arsenic). As described below with reference to FIGS. 6 & 7 and the Examples, the leaching process has two stages. In the first leaching stage the solution Eh is carefully controlled to promote oxidation and solubilisation of arsenic in its +3 oxidation state rather than its relatively less soluble +5 state, whilst not substantially oxidising pyrite in the arsenopyritic material. In the second leaching stage an oxidant (such as oxygen, air, chlorine, hydrogen peroxide etc) is added to raise the solution oxidation potential and thereby oxidise the pyrite (which at the same time oxidises any remaining arsenic to its +5 oxidation state). In the second process mode, and in the second leaching stage, As(V) can either be maintained in solution by controlled acid addition (such as sulfuric acid) to lower the solution pH sufficient to solubilise the arsenic, or it can be maintained in a precipitated form so that it passes out of the process with the pyritic residues.

Again, the process solution is typically an aqueous cupric chloride solution, preferably having a chloride concentration of 7-8 moles/liter. Again, the copper acts as a leaching agent and as an electron transfer agent.

Again, where the sulfidic material has a high carbon content (eg. greater than 2 wt %) a masking surfactant may be added to the solution at stage 14 to prevent adsorption onto carbon of any precious metal leached into the solution.

At acid pH less than 1, and at a controlled Eh in the range of from 0.4 to 1.25 volts, optimally at around 0.5 volts, arsenic can be oxidised and leached into solution, preferably in its relatively soluble +3 oxidation state, without oxidising pyritic sulfide to sulfate which can interfere with solution characteristics.

In the first leaching stage the arsenopyrite concentrate is leached for a predetermined period of time (as described below in the Examples) until a predetermined amount of arsenic has been leached out of the arsenopyrite material (typically around 85% of total in the first leaching stage, with an additional 10% of total being leached in the second leaching stage). In any case, the amount leached is typically determined by acceptable residual levels in the leached arsenopyrite material, assuming that it is to be separated and subsequently processed by conventional smelting or roasting techniques, or disposed of (as described below). The term "refined arsenopyrite" or "refined sulfidic material" is thus to be interpreted in this regard.

Thus, in the second process mode, the solution pH and Eh are regulated such that arsenic and the multi-valent species Cu(II) (which oxidises and leaches the arsenic from the material) remain in solution and do not precipitate therefrom in the first leaching stage.

In addition, the process operating conditions are controlled such that the arsenic is maintained in solution during solid/liquid separation (which separates the refined arsenopyrite solids from the solution) until the solution is fed to an arsenic precipitation stage. In FIG. 5 this is depicted schematically as a thickening stage 16. In the process of FIGS. 6 & 7 this thickening stage is employed after the first leaching stage. In thickening stage 16 the refined arsenopyrite solids are flocculated (ie. by adding thereto a flocculating agent), with the solids dropping out as an underflow stream 18 and the arsenic and precious metal pregnant supernatant solution passing out of the thickening stage as an overflow stream 20. In FIG. 5 the underflow or slurry 18 is then passed to a solid-liquid separation stage 22, where typically the solids are filtered from the solution using known filtering apparatus.

The resulting liquid filtrate 24 is returned to overflow stream 20, whereas the filtered solids (ie. refined arsenopyrite) 26 are passed to a conventional roasting stage 28 and conventional cyanide leaching stage 30 for recovery of remaining precious metal as gold product 32.

Depending on the degree of leaching of precious metal in arsenic leaching stage 14, gold (and any other precious metal) may pass with combined liquid stream 34 (combining streams 20 and 24) and be recovered in an in-line precious metal recovery stage 36. The recovery stage comprises one or more columns filled with activated carbon through which the solution is passed upwardly in a fluidised bed arrangement. Dissolved gold (or other precious metal) in the solution adsorbs onto the carbon, whilst the dissolved arsenic in solution passes through the column as an overflow liquid stream 38. The activated carbon bearing gold is then removed periodically and passed as a gold product stream 40 (together with gold product stream 32) to a gold recovery process (eg. by burning or eluting the carbon product).

From metal recovery stage 36, the solution 38 (including dissolved arsenic) is passed to a contaminant precipitation stage in the form of arsenic precipitation stage 42. Stage 42 is typically operated at pH 1.5-3. In stage 42 an oxidant is introduced (eg. sparged) into the solution (eg. as air, oxygen, chlorine etc.) to raise the solution oxidising potential (Eh), causing the dissolved arsenic to form a precipitate, typically the insoluble ferric arsenate precipitate (ie. $FeAsO_4$ or scorodite). Where the contaminant includes eg. antimony, the contaminant can assume the insoluble form ferric antimonate. As the contaminant precipitate forms, an acid is typically generated and thus an alkali may be added to consume acid and maintain optimum solution pH and Eh. Typically the alkali is an alkali salt such as calcium carbonate, calcium oxide etc, which has the further advantage of precipitating out any sulphate in the process liquor.

In the second process mode the addition of oxidant and alkali is regulated to maintain optimum pH and Eh levels in the contaminant precipitation stage 42 until all contaminant is precipitated. Thereafter, the solution pH and Eh levels are as necessary restored to those of the leaching stage 14 so that, after contaminant precipitation, the solution can be recycled to the leaching stage.

Also, in the precipitation stage of the second process mode, the oxidant causes the cuprous copper to be oxidised to cupric copper, thus regenerating this species and allowing for its recycle and reuse. Accordingly, regulation of solution Eh and pH advantageously promotes the re-oxidation of the multi-valent species whilst maintaining it in solution at all times so that, in the overall process, copper alternates between its +1 oxidation state and +2 oxidation state, functions as an electron transfer agent and participates in leaching. Regeneration of the multi-valent species enhances the process economics, simplifies the process and allows the process mass balance to be completed.

After arsenic precipitation, the arsenic precipitate is separated from the process liquor in a solid/liquid separation stage. In FIG. 5 this is depicted as a further thickening stage 44, to produce a solids (arsenic precipitate) underflow 46, which is then passed to a further solid-liquid separation stage 48. A supernatant liquid overflow stream 50 is passed out of the top of the thickening stage 44. In the solid liquid separation stage 48, typically the arsenic precipitate is filtered out using filtration apparatus, producing a waste arsenic product 52. The liquid filtrate is returned to the overflow stream 50 as liquid flow 54. The combined liquid stream 56 is then passed to a further precious metal recovery stage 58, for example, an activated carbon column etc to recover any metal not recovered at stage 36. Alternatively stage 58 can be used instead of stage 36. The resultant precious metal and activated carbon stream 60 is combined with the other precious metal recovery streams 40 and 32, whilst a solution overflow 62 is recycled to the arsenic leaching stage 14 to close the process recovery loop.

To treat any contaminant build up in the overall process, a proportion of the recycle stream 62 may be recycled to a bleed circuit 64 to separate out any contaminant not recovered in the arsenic precipitation stage and optionally any other contaminants such as Mn, Cd, Ni, Co etc.

Now that the second process mode has been described in overview, preferred second process mode flowpaths will be described with reference to FIGS. 6 & 7.

Figure 6:
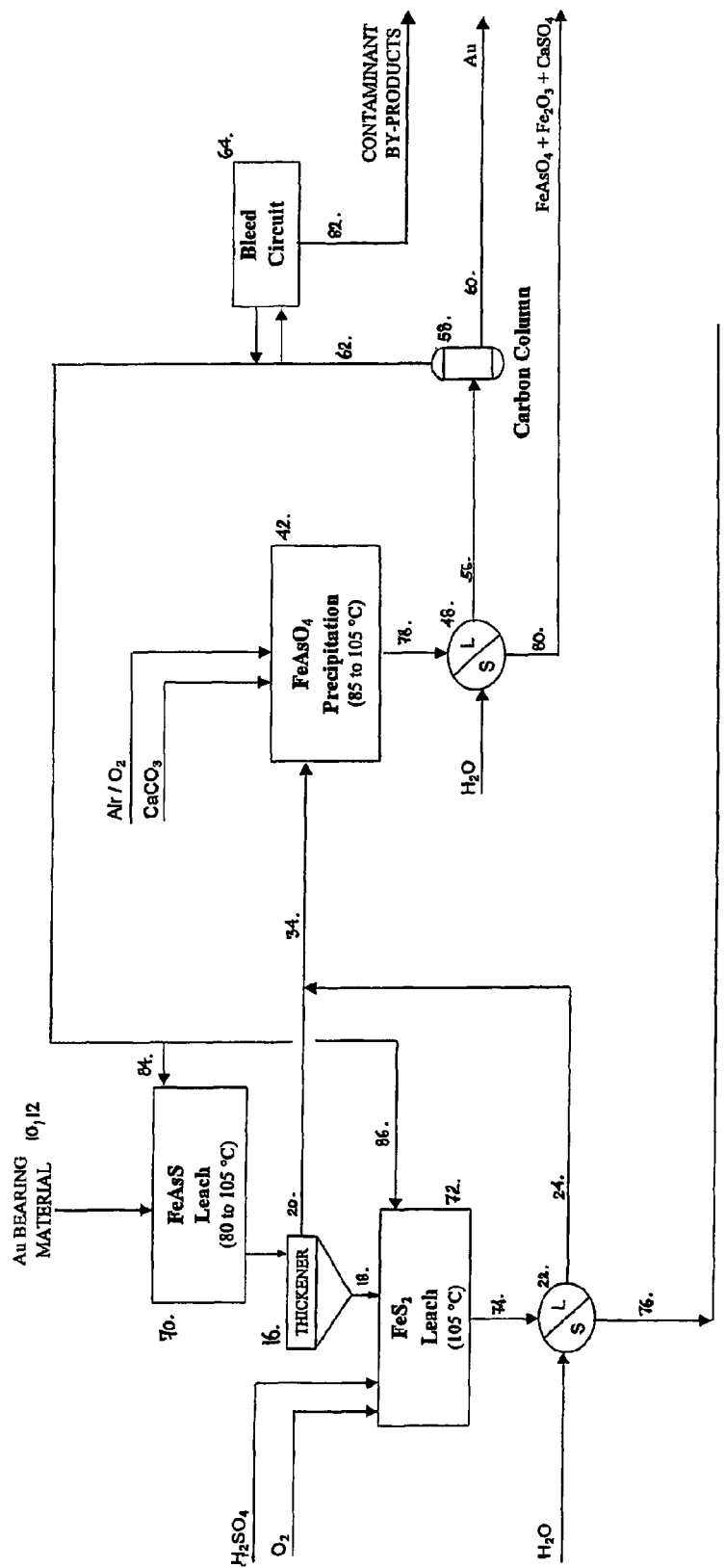
FIG. 6 schematically depicts a process flow diagram for a preferred process for removing a contaminant from a single-refractory sulfidic material and recovery of precious metal from the sulfidic material.

FIG. 6 shows a process flowsheet for the treatment of a single-refractory sulfidic material. In FIG. 6, like reference numerals are used to denote similar or like process stages to that of FIG. 5. In a similar manner to the process of FIG. 5, a gold-bearing arsenopyritic concentrate of low or no carbon content (i.e. single-refractory) is prepared and ground 10,12. The ground concentrate is then fed to a preferred leaching process. The preferred leaching process has two stages, namely, a first arsenopyritic (FeAsS) leaching stage 70 and a second pyritic (FeS$_2$) leaching stage 72.

The arsenopyritic concentrate is fed to first leaching stage 70 wherein the leaching conditions are controlled such that substantially only the arsenic in the concentrate is oxidised and leached into solution and not the pyritic component of the concentrate. In this regard, the leaching conditions in first leaching stage 70 are controlled such that the oxidation potential Eh is around 0.5 volts, the solution pH is less than 1, and the solution temperature is maintained at about 105° C. (although it can be operated in a range between 80° C. and 105° C.). These conditions were observed by the inventors to be optimal for the leaching of arsenic into solution. As discussed below in Example 11, after about 6 hours of leaching, approximately 85% of the total arsenic in the arsenopyritic concentrate was leached into solution.

When a predetermined amount of arsenic has been leached into solution, the solution and arsenic refined arsenopyrite is passed to a thickening stage 16, in a similar manner to the process described in FIG. 5. Refined arsenopyrite solids are flocculated and drop out as underflow stream 18, whereas the arsenic pregnant supernatant solution passes out of the thickener as overflow stream 20 to arsenic precipitation stage 42.

In the second process mode the refined arsenopyrite solid stream 18 is now passed to the second leaching stage 72 for leaching of pyrite. The oxidising conditions in the second leaching stage are more severe than the first leaching stage. Eh this regard an oxidant such as oxygen is sparged into the solution so that the oxidation potential Eh is increased to at least 0.6 volts, and typically greater than 0.8 volts. In addition, the temperature of the solution in the second leaching stage is maintained at around 105° C. The pH of the solution in the second leaching stage is still maintained at less than pH 1.

Because acid is consumed in the second stage leaching process (ie. as Cu(II) and Fe(III) are reduced to Cu(I) and Fe(II) respectively) it may be necessary to periodically or continuously supply acid to the solution, such as sulphuric acid, hydrochloric acid or another acid that does not interfere with the process chemistry. However, the requirement for top-up acid depends on whether sufficient sulfuric acid is produced by the leaching of pyrite. Maintaining low pH in the second leaching stage also helps solubilise As(V) as required.

In the second leaching stage the sulfide material is oxidised through to sulfate, iron is leached into solution as Fe(III) and a proportion of any remaining arsenic in the arsenopyritic ore is also leached into solution. The inventors have observed that a further 10% of the total arsenic can be leached into solution, such that final residual arsenic from the leaching process is at 5% or less of total in the concentrate feed. This equates with arsenic levels that are sufficiently low for the residues from the process to be safely disposed of.

The leachate from second leaching stage 72 is passed as a stream 74 to a solid-liquid separation stage 22, similar to FIG. 5, where the residual solids are filtered from the solution and a liquid filtrate stream 24 is returned to and combined with overflow stream 20 for passing to arsenic precipitation stage 42. Solid residues filtered out at stage 22 are then passed to tails as stream 76, either as filtered solids or as a slurry. Alternatively, the solids may be further processed for residual metals recovery. Water may be added at stage 22 to maintain water levels in the process and/or to top up water that is lost with the process residue.

In a single refractory arsenopyritic material and pyritic material gold or other precious metal is not associated to any significant extent with carbon and is thus typically leached into solution in both the first and second leaching stages and can therefore be recovered in the process circuit.

In the process of FIG. 6, in arsenic precipitation stage 42, the pH of the solution is adjusted to approximately 2 to 3 (e.g. by the addition of calcium carbonate), and an oxidant such as air or oxygen is added to the solution to oxidise the arsenic from its soluble +3 state to its insoluble +5 state. Advantageously, because Fe(III) is present in the solution from the oxidation of pyrite in the second leaching stage, the arsenic precipitates out as scorodite (FeAsO$_4$). As a further advantage, because sulfide has been oxidised to sulfate in the second leaching stage, the addition of calcium carbonate can be used both to raise the solution pH in the arsenic precipitation stage, and to precipitate out the sulfate as calcium sulfate.

The arsenic/solids precipitate together with the process solution is then passed as stream 78 to solid-liquid separation stage 48 where the solids are filtered from the solution. The solids residue stream 80 typically comprises $FeAsO_4$, $Fe_2O_3$ and $CaSO_4$ in a form suitable for disposal (e.g. as landfill). The solids may be removed as a slurry and hence top-up water can be added to the process at stage 48. Thus, arsenic, iron and sulfur can advantageously be recovered in readily disposable forms from an original arsenopyrite concentrate.

The conditions in the arsenic precipitation stage do not affect the precious metal leached into solution in the leaching stage and thus the separated solution 56 can now be passed to a precious metal recovery stage 58, in a similar manner to the process of FIG. 5. Stage 58 comprises one or more columns housing activated carbon onto which the precious metals, typically gold, are adsorbed and periodically a gold product stream 60 is removed from stage 58 for gold recovery (by burning or eluting the carbon with adsorbed gold thereon).

As in the process of FIG. 5, the solution overflow 62 from stage 58 is recycled to the leaching process, and a proportion of the recycled stream may be drawn off to bleed circuit 64 to separate out the contaminants which can build up in the process, thereby producing contaminant by-product stream 82.

In the second process mode, solution recycle 62 is split to produce a first leaching stage recycle component 84 and a second leaching stage recycle component 86. For a copper chloride process liquor, copper in its +2 oxidation state is recycled to each of the leaching stages to participate in arsenopyritic leaching in the first leaching stage and pyrite leaching in the second leaching stage.

Figure 7:
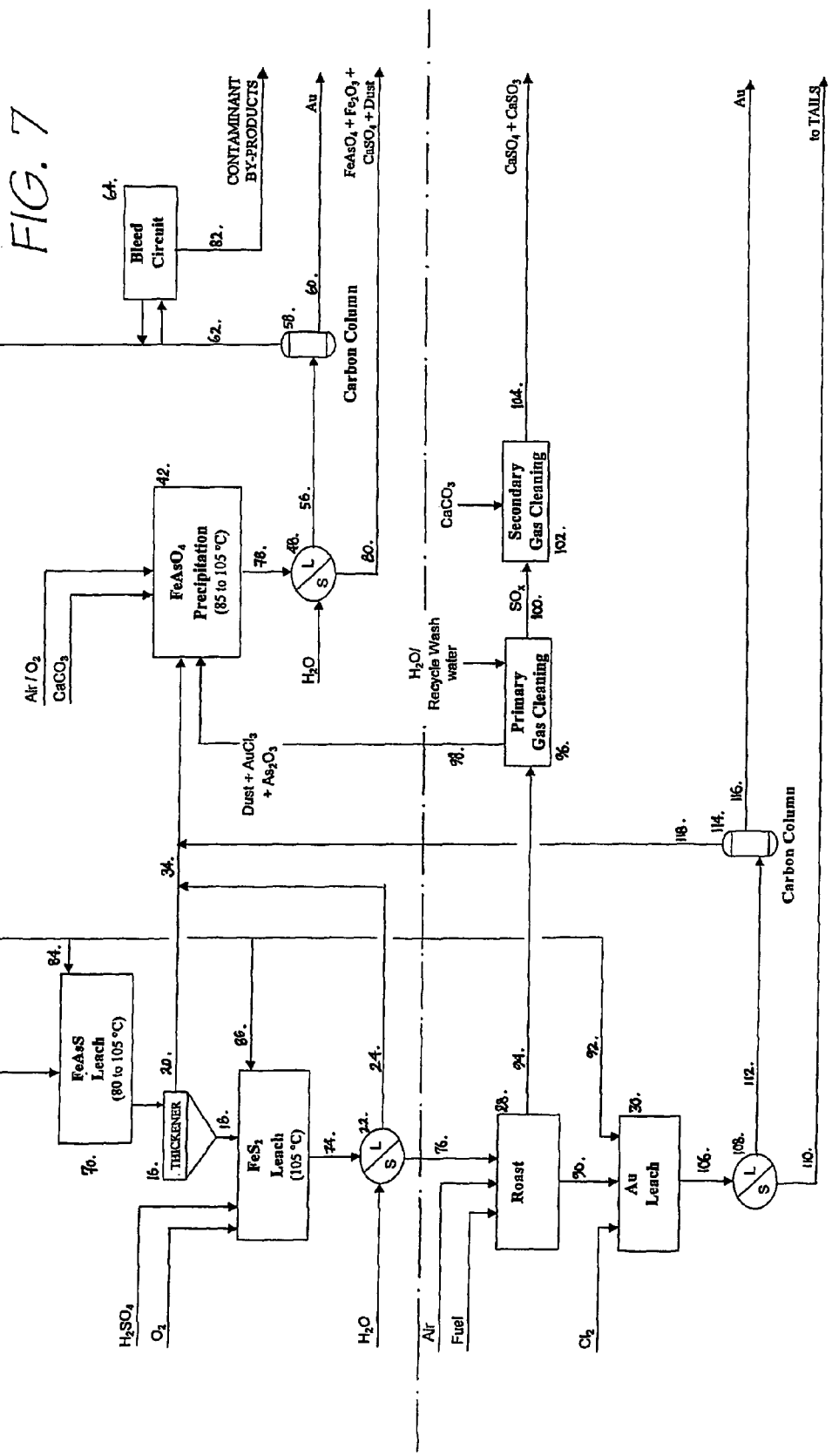
FIG. 7 schematically depicts a process flow diagram for a preferred process for removing a contaminant from a double-refractory sulfidic material and recovery of precious metal from the sulfidic material.

Referring now to FIG. 7 a second process mode flowsheet for the treatment of a double-refractory sulfidic material is shown. In FIG. 7, like reference numerals are used to denote similar or like process stages to that of FIGS. 5 and 6. In addition, the upper half (ie. above the dotted line) of the process flowsheet of FIG. 7 is essentially the same as that of FIG. 6 and hence those process stages will not be described again.

In a double-refractory arsenopyritic the precious metal (eg. gold) is typically associated with carbon and hence that associated gold is not readily leached into solution in the first or second leaching stages. Accordingly, solids stream 76 includes solid residues together with an associated carbon/gold component. However, because the leaching process has substantially removed arsenic, iron, sulfur and other contaminants to acceptably low levels, the solids residue from the leaching process is now highly suitable for roasting or smelting in roasting stage 28.

In roasting stage 28, air and fuel together with solids material 76 are roasted in a conventional manner, producing a product stream 90 which is then fed to a gold leaching stage 30 in a known manner. Gold leaching is typically conducted by oxidising the roasted solids with chlorine gas or cyanide (although chlorine gas is preferable because it is less toxic than cyanide). In the second process mode, a proportion 92 of solution recycle from the arsenic precipitation stage 42 is fed to the gold leaching stage 30 to assist with overall process economics.

Exhaust gas stream 94 from the roasting stage 28 (typically comprising carbon dioxide, sulfur dioxide and other $SO_x$ gases) is fed to a primary gas cleaning stage 96. The primary gas cleaning stage typically comprises one or more scrubbers in which water and optionally recycled wash water are contacted with the gas stream 94. Advantageously, any dust in gas stream 94 can be filtered. Such dust may include gold chloride ($AuCl_3$) and arsenous oxide ($As_2O_3$). This dust together with other particulates can be fed as solids or in solution as a stream 98 back into the arsenic precipitation stage 42 for further recovery of arsenic and gold.

Residual gases from the primary gas cleaning stage 96 are passed as stream 100 to secondary gas cleaning stage 102, typically comprising gas scrubbers in which calcium carbonate in solution is contacted with the $SO_x$ containing gases. Product stream 104 from the secondary gas cleaning stage 102 typically therefore comprises calcium sulfate and calcium sulfite.

The leachate stream 106 containing dissolved gold from the gold leaching stage 30 is now passed to a solid-liquid separation stage 108 to separate the gold containing solution from the solids residue. The solids residue stream 110 is passed to tails for disposal, whereas the gold pregnant solution is passed to a gold recovery stage 114, typically comprising an activated carbon containing column. Carbon and adsorbed gold is periodically removed out as stream 116 for gold recovery, whereas gold depleted solution 118 is recycled to the leaching/arsenic removal circuit to be combined with stream 34.

SECOND PROCESS MODE EXAMPLES

Now that optimal flowpaths for the second process mode have been described, preferred examples for the second process mode will now be described. In the following examples, a highly refractory arsenopyrite concentrate from Bakyrchik, Kazakstan was processed. The aim was to develop a process that permitted processing of all samples of arsenopyrite ore provided from the Bakyrchik mine.

Example 4

Concentrate Characterisation

Method:

6 kg of concentrate was processed by ultra fine regrinding. The concentrate possessed a $P_{100}$ 20 microns particle size.

| | Product |
|---|---|
| Laser microns | Wt % passing |
| 20 | 100 |
| 18 | 99 |
| 15 | 96 |
| 12 | 89 |
| 10 | 81 |
| 8 | 69 |
| 6 | 50 |
| 5 | 42 |
| 3 | 15 |

The concentrate at $P_{100}$ 20 microns was received in three cakes, the moisture content of each cake was determined, and the average was used as the moisture content for the concentrate.

Cake 1

Wet sample+paper: 113.84 g

Dry sample+paper: 85.68 g

Paper: 4.83 g

Dry sample: 80.85 g

% Moisture: 25.8%

Cake 2

Wet sample+paper: 88.35 g

Dry sample+paper: 66.68 g

Paper: 4.83 g

Dry sample: 62.02 g

% Moisture: 25.9%

Cake 3

Wet sample+paper: 86.41 g

Dry sample+paper: 68.79 g

Paper: 4.85 g

Dry sample: 63.94 g

% Moisture: 21.6%

The average moisture content determined was 24.4%. From this it was calculated that 100 g of dry concentrate translated to 132.3 g of the wet concentrate sample.

Example 5

Oxidation Leach

Tests were then conducted on the $P_{100}$=20 microns reground sample to provide initial evidence of arsenic leaching via a process of oxidation. The Bakyrchik ore concentrate was noted to contain arsenic as an arsenopyrite. The reaction was designed to determine if this arsenic could be rendered soluble (and hence be selectively removed) using cupric copper as oxidant.

Method:

A 1 L solution of 80 g/L $Cu^{2+}$ (as $CuCl_2$ 205.13 g), 100 g/L $CaCl_2$, 200 g/L NaCl and 30 g/L NaBr was prepared. 140 g of wet concentrate (~24% moisture, therefore 105.8 g dry concentrate) was added to this the solution and the resultant slurry stirred at 105° C. The pH, Eh and Fe and Cu content were measured over the course of four hours.

Solids were subsequently filtered using a Buckner apparatus and the filtrate preserved for further analysis. Solid cake was washed with low pH brine (~0.5 L, 280 g/L, pH 0.3), the resultant moist cake was weighed, dried in an oven and weighed again. The dry solids were preserved for further analysis.

Results and Discussion:

The pH, Eh and Fe and Cu tenor recorded over time were summarised as per the table below.

| Time (min) | pH | Eh (mV) | Fe (g/L) | $Cu^{tot}$ (g/L) |
|---|---|---|---|---|
| 0 | | | | |
| 30 | 1.45 | 740 | 2.4 | 70.6 |
| 60 | 0.5 | 508 | 2.5 | 68 |
| 90 | 0.5 | 507 | 2.5 | 63 |
| 150 | 0.5 | 495 | 2.65 | 64 |
| 210 | 0.35 | 502 | 2.65 | 61 |
| 270 | 0.35 | 495 | 2.68 | 64 |
| 330 | 0.35 | 485 | 2.66 | 65 |

The residue assay shows an As concentration of 0.66%. Considering a calculated mass loss of 6.5%, the As was leached with an efficiency of 82.3%

The reaction appeared to proceed quickly. A significant drop in Eh and pH was observed within the first hour of the reaction's progress. After this time the reaction stabilised and did not appear to progress further.

Example 6

Oxidation Leach

The aim of this example was to investigate whether fresh liquor would facilitate the further leaching of the iron/arsenic from the previously leached material. It was surmised that treatment of the solid obtained from the previous leach would remove more of the arsenopyrite. A fresh solution of the primary liquor was prepared and a repeat of the previous leach was performed using the leached material as the solid feed.

Method:

A 500 ml solution of 80 g/L $Cu^{2+}$ (as $CuCl_2$ 102.55 g), 100 g/L $CaCl_2$, 200 g/L NaCl and 30 g/L NaBr was prepared. 30 g of the leached concentrate obtained from the previous oxidation was added to this solution and the resultant slurry stirred at 105° C. pH and Eh were measured over the course of four hours. Solids were subsequently filtered using a Buckner apparatus and the filtrate preserved for further analysis. Solid cake was washed with low pH brine (~0.5 L, 280 g/L, pH 0.3), the resultant moist cake was weighed, dried in an oven and weighed again. The dry solids were preserved for further analysis.

Samples taken from the solids obtained from this and the previous reaction as well as the original concentrate were digested using Aqua-regia/perchloric acid. These solutions were then analysed or Arsenic using ICP.

Results and Discussion:

The pH, Eh recorded over time were summarised as per the table below.

| Time (min) | pH | Eh (mV) |
|---|---|---|
| 0 | 1.32 | 741 |
| 0 | 1.2 | 615 |
| 30 | 0.55 | 588 |
| 60 | 0.31 | 583 |
| 90 | 0.29 | 580 |
| 120 | — | 579 |
| 150 | 0.31 | 569 |
| 180 | 0.3 | 574 |
| 210 | 0.29 | 574 |
| 240 | 0.32 | 572 |

Wet cake+paper+filter paper: 72.5 g

Dry cake+paper+filter paper: 40.24 g

Paper+filter paper: 11.5 g

Dry cake obtained: 28.74 g

The ICP analysis for Arsenic in the recovered solids were summarised as per the table below:

|  | As | |
| --- | --- | --- |
|  | Content (wt %) | Extraction (% As in concentrate) |
| Bakyrchik concentrate | 3.49 | 0 |
| Leach 1 | 0.66 | 82.3 |
| Leach 2 | 0.42 | 88.9 |

As was observed in the previous leach the reaction appeared to proceed quickly, stabilising over the course of an hour. A significant drop in Eh and pH was again observed along with a decrease in the mass of the solids recovered when compared to the mass of the solids fed to the solution. This suggested that there was material left in the residue from the primary leach that was still extractable. An analysis of the arsenic content of both the feed and solid residue from both leaches revealed a progressive reduction in the arsenic content of the solids recovered. The results suggested that the method could be refined to selectively leach the arsenic contained within the Bakyrchik concentrates.

Example 7

Oxidation Leach

The aim of this example was to refine the conditions used in leaching arsenic from the Bakyrchik ore. Having succeeded in leaching ~65% of the arsenic contained within the Bakyrchik ore, the method was refined to obtain a greater leach performance. The method focused on two areas: firstly the leach liquor was simplified, and secondly, the reaction was carried out at various temperatures and starting pH's to determine the effect these changes had on improving the leach efficiency.

Method:

A 5 L solution of 80 g/L $Cu^{2+}$ (as $CuCl_2$ 1025.64 g), 150 g/L $CaCl_2$ (750 g) and 150 g/L NaCl (750 g) was prepared and heated to 80° C. This solution was then divided into three 1.5 L solutions, each solution performing an oxidation leach under different conditions on the equivalent of 142.86 g wet concentrate (~24% moisture, therefore 108 g dry concentrate).

Oxidation Leach Solution 1: Leach was performed at 80° C.

Oxidation Leach Solution 2: Leach was performed at 100° C.

Oxidation Leach Solution 3: Leach was performed at 80° C. Starting pH<0.4, Eh>550 mV The pH and Eh of these solutions was measured over the course of two and a half hours. Samples from each were taken at intervals and analysed for their iron and copper content.

Solids were subsequently filtered using a Buckner apparatus and the filtrate preserved for further analysis. Solid cake was washed with low pH brine (~1 L, 280 g/L, pH 0.3), and the resultant moist cake was weighed, dried in an oven and weighed again. The dry solids were preserved for further analysis.

Samples taken from the solids obtained from each reaction as well as the original concentrate were digested and analysed for arsenic, copper and iron using ICP.

Results and Discussion:

Oxidation Leach 1 (80° C.) Solution Assays

| Time (min) | pH | Eh (mV) | Cu (g/L) | Fe (g/L) | As (ppm) From ICP | Comments |
| --- | --- | --- | --- | --- | --- | --- |
| 0 | 2.15 | 720 |  |  |  | Solids added |
| 0 | 1.58 | 568 | 71 | — | — |  |
| 30 | 0.95 | 535 | 77 | 0.79 | 824 |  |
| 60 | 0.75 | 525 | 77 | 1.14 | 1033 |  |
| 90 | 0.70 | 520 | 75 | 1.28 | 1152 |  |
| 120 | 0.70 | 520 | 75 | 1.41 | 1216 |  |
| 150 | 0.70 | 516 | 74 | 1.53 | 1308 |  |

Wet cake+paper+filter paper: 173.24 g

Dry cake+paper+filter paper: 105.48 g

Paper+filter paper: 11.5 g

Dry cake obtained: 93.98 g

Oxidation Leach 2 (100° C.) Solution Assays

| Time (min) | pH | Eh (mV) | Cu (g/L) | Fe (g/L) | As (ppm) From ICP | Comments |
| --- | --- | --- | --- | --- | --- | --- |
| 0 | 1.88 | 735 |  |  |  | Solids added |
| 0 | 1.5 | 561 | 71 | — | — |  |
| 30 | 1.1 | 525 | 79 | 1.75 | 1473 |  |
| 60 | 1.05 | 528 | 79 | 1.85 | 1532 |  |
| 90 | 0.98 | 529 | 80 | 2.0 | 1636 |  |
| 120 | 0.94 | 525 | 84 | 2.0 | 1678 |  |
| 150 | 0.89 | 528 | 85 | 2.14 | 1761 |  |

Wet cake+paper+filter paper: 170.3 g

Dry cake+paper+filter paper: 113.32 g

Paper+filter paper: 11.5 g

Dry cake obtained: 101.82 g

Oxidation Leach 3 (80° C., low pH) Solution Assays

| Time (min) | pH | Eh (mV) | Cu (g/L) | Fe (g/L) | As (ppm) From ICP | Comments |
| --- | --- | --- | --- | --- | --- | --- |
| 0 | 0.35 | 712 |  |  |  | Solids added |
| 0 | 0.8 | 564 | 71 | — | — |  |
| 30 | 0.55 | 540 | 76 | 1.06 | 741 |  |
| 60 | 0.43 | 532 | 74 | 1.41 | 975 |  |
| 90 | 0.5 | 525 | 74 | 1.51 | 1082 |  |
| 120 | 0.4 | 520 | 75 | 1.61 | 1162 |  |
| 150 | 0.43 | 515 | 73 | 1.61 | 1181 |  |

Wet cake+paper+filter paper: 172.4 g

Dry cake+paper+filter paper: 108.46 g

Paper+filter paper: 11.5 g

Dry cake obtained: 96.96 g

The ICP analysis for arsenic, copper and iron in the recovered solids are summarised as per the table below.

|      | As % | Cu % | Fe % | As % Extraction |
|------|------|------|------|------|
| Cons | 3.22 | 0.09 | 8.38 | 0.0 |
| Leach 1 | 1.07 | 0.31 | 5.22 | 71.1 |
| Leach 2 | 0.25 | 0.30 | 2.85 | 92.7 |
| Leach 3 | 1.57 | 0.30 | 5.40 | 56.2 |

These results clearly indicate that the rate of reaction is significantly higher at 100° C. than at 80° C.

Example 8

Iron/Arsenic Rejection Process

Method:

Liquor obtained from a previous oxidation reaction (10 L) was returned to the vat and heated to 80° C. with low stirring. Upon reaching this temperature the pH and Eh of the liquor were measured and a sample taken. The liquor was then aerated (100 L/hr) with agitation, and the pH and Eh of the liquor was measured and a sample was taken every thirty minutes thereafter. After four hours the rejection process was considered to be complete, the liquor was filtered using a Buchner apparatus and the rejected precipitate was removed as a filter cake. The wet cake was weighed, and then dried over twenty-four hours in an oven. The dry cake was then weighed and a sample digested for analysis.

Results and Discussion:

The pH and Eh and tenor of the liquor over time were summarised as per the table below.

| Time mins | pH | Eh (mV) | Sample No. | As (g/L) | Fe (g/L) | AAS Cu (g/L) | AAS Fe (g/L) | Comments |
|---|---|---|---|---|---|---|---|---|
| 0 | 0.7 | 500 | 1 | 2.8 | 3.7 | 88 | 3.7 | Vol: 10 L |
| 0 | 0.7 | 500 | — | — | — | — | — | air@100 L/Hr |
| 30 | 1.1 | 510 | 2 | 2.3 | 3.6 | 90 | 3.3 | |
| 60 | 1.5 | 520 | 3 | 1.2 | 2.7 | 90 | 2.6 | |
| 90 | 1.6 | 525 | 4 | 0.6 | 2.4 | 91 | 2.2 | |
| 120 | 2.0 | 530 | 5 | 0.3 | 1.3 | 85 | 1.6 | |
| 150 | 2.1 | 535 | — | — | — | — | — | |
| 180 | 2.1 | 545 | — | — | — | — | — | |
| 210 | 2.2 | 555 | — | — | — | — | — | |
| 240 | 2.5 | 570 | 6 | ND | 0.5 | 88 | <0.1 | $Cu^{tot}$ 88, $Cu^{2+}$: 88 |

Wet cake+paper+filter paper: 257.2 g

Dry cake+paper+filter paper: 128.94 g

Paper+filter paper: 11.5 g

Dry cake obtained: 117.44 g

Analysis of the precipitate shows the following results:

| Element | Concentration (wt %) |
|---|---|
| As | 19.0% |
| Fe | 33.8% |
| Cu | 1.5% |

Over the four hour period of the experiment, essentially 100% of both the iron and arsenic were precipitated, whilst concurrently the oxidation potential (Eh) was restored to a level higher enough to be used for further leaching. The Fe/As molecular ration being 2.4, it is anticipated that FeAsS was precipitated with other Fe based compounds.

Example 9

Iron/Arsenic Rejection Process

Method:

Liquor obtained from the oxidation reaction (10 L) was returned to the vat and heated to 80° C. with low stirring. Upon reaching this temperature the pH and Eh of the liquor were measured and a sample taken. The liquor was then aerated (100 L/Hr) with agitation; and the pH and Eh of the liquor was measured and a sample was taken every thirty minutes thereafter. After four hours the rejection process was considered to be complete, the liquor was filtered using a Bucher apparatus and the rejected iron precipitate was removed as a filter cake. The wet cake was weighed, and then dried over twenty-four hours in an oven. The dry cake was then weighed and a sample digested for analysis.

Results and Discussion:

The pH and Eh and tenor of the liquor over time were summarised as per the below.

| Time mins | pH | Eh (mV) | Sample No. | As (g/L) | Fe (g/L) | AAS Cu(g/L) | AAS Fe (g/L) | Comments |
|---|---|---|---|---|---|---|---|---|
| 0 | 0.7 | 500 | 1 | 2.8 | 3.7 | 88 | 3.7 | Vol: 10 L |
| 0 | 0.7 | 500 | — | — | — | — | — | air@100 L/Hr |
| 30 | 1.1 | 510 | 2 | 2.3 | 3.6 | 90 | 3.3 | |
| 60 | 1.5 | 520 | 3 | 1.2 | 2.7 | 90 | 2.6 | |
| 90 | 1.6 | 525 | 4 | 0.6 | 2.4 | 91 | 2.2 | |

-continued

| Time mins | pH | Eh (mV) | Sample No. | As (g/L) | Fe (g/L) | AAS Cu(g/L) | AAS Fe (g/L) | Comments |
|---|---|---|---|---|---|---|---|---|
| 120 | 2.0 | 530 | 5 | 0.3 | 1.3 | 85 | 1.6 | |
| 150 | 2.1 | 535 | — | — | — | — | — | |
| 180 | 2.1 | 545 | — | — | — | — | — | |
| 210 | 2.2 | 555 | — | — | — | — | — | |
| 240 | 2.5 | 570 | 6 | ND | 0.5 | 88 | <0.1 | $Cu^{tot}$ 88, $Cu^{2+}$: 88 |

Wet cake+paper+filter paper: 257.2 g

Dry cake+paper+filter paper: 128.94 g

Paper+filter paper: 11.5 g

Dry cake obtained: 117.44 g

Moisture component: 128.26 g (47.8%)

Example 10

Leach on Regenerated Liquor, Lower Slurry Density

Method:

A 90 g sample of wet concentrate (~24% moisture, therefore 68 g dry concentrate) was added to the liquor obtained from the oxidation reaction (1.5 L) and the resultant slurry stirred at 100-105° C. The pH and Eh of the liquor were monitored and a sample taken every thirty minutes over a four hour period. After this period the liquor was filtered using a Bucher apparatus and the filter cake removed, the wet cake was weighed and then dried over twenty-four hours in an oven. The dry cake was then weighed and a sample digested for analysis.

Results and Discussion:

The pH and Eh and tenor of the liquor over time is summarised in the table below.

| Time (min) | pH | Eh (mV) | Sample No. | AAS Cu (g/L) | AAS Fe (g/L) | ICP As (g/L) | ICP Cu (g/L) | ICP Fe (g/L) |
|---|---|---|---|---|---|---|---|---|
| 0 | 2.5 | 600 | — | | | | | |
| 10 | 1.8 | 555 | — | | | | | |
| 30 | 1.5 | 550 | 1 | 90 | 1.5 | | | |
| 60 | 1.3 | 545 | 2 | 89 | 1.1 | | | |
| 90 | 1.2 | 540 | 3 | 87 | 1.2 | | | |
| 120 | 1.1 | 540 | 4 | 67 | 0.8 | | | |
| 150 | 1.1 | 535 | 5 | 88 | 1.0 | | | |
| 180 | 1.0 | 535 | 6 | 85 | 1.0 | | | |
| 210 | 1.0 | 535 | 7 | 88 | 1.0 | | | |
| 240 | 1.0 | 536 | 8 | 87 | 1.1 | | | |

Dry cake obtained: 58 g

FIRST & SECOND LEACHING STAGE EXAMPLES

Example 11

First Stage Leaching

In this example, the aim was to confirm through a simulation of a continuous process that the operating conditions used for batch testing would apply to a commercial operation. This experiment also provided material to be used for a pyrite oxidation at atmospheric pressure.

Figure 8:
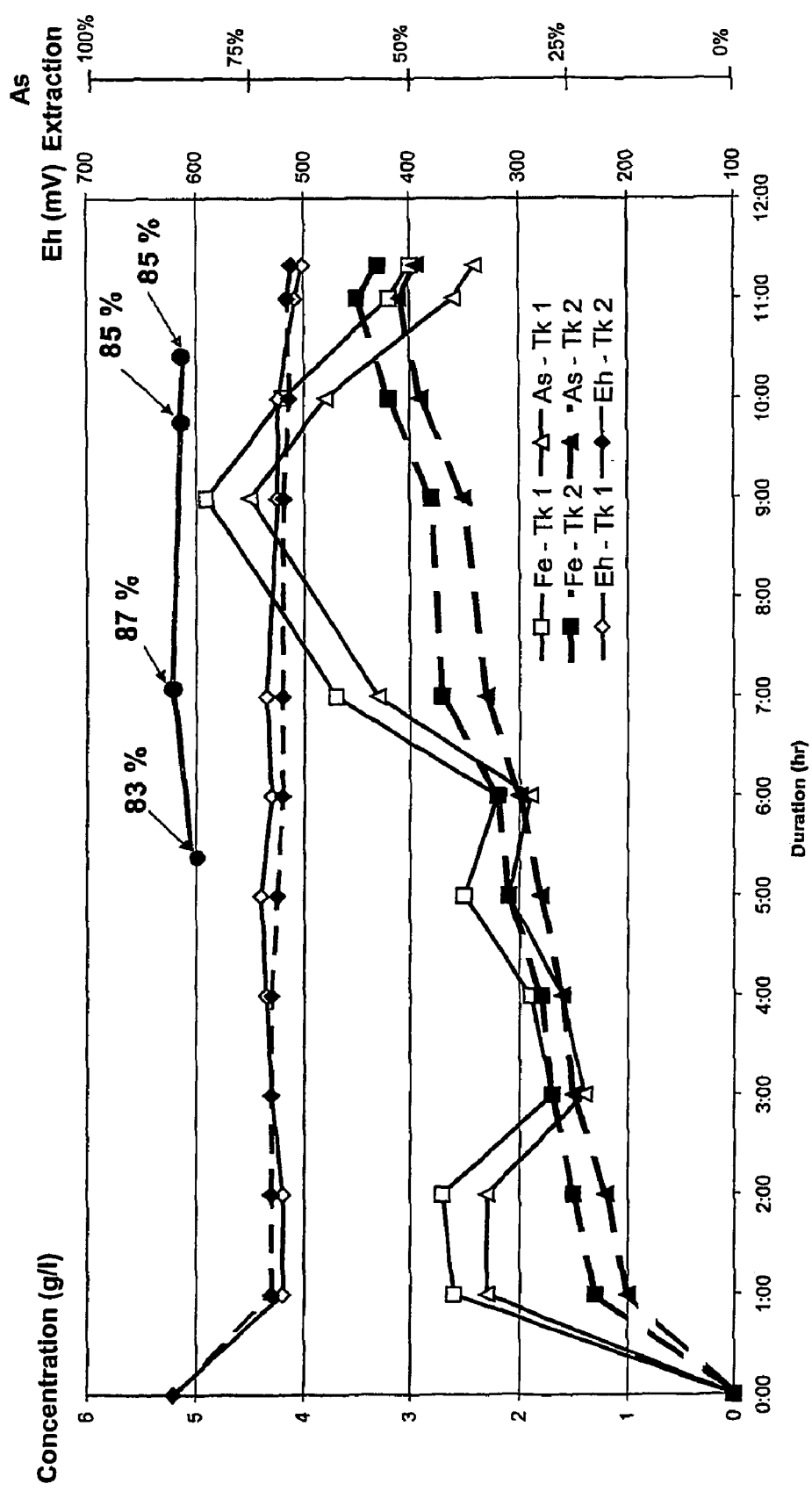
FIG. 8 is a graph plotting various first stage (arsenic) leaching solution parameters against time (duration of reaction) for the process of FIGS. 6 & 7.

As shown in FIG. 8, continuous operation under conditions similar to the batch processes of Examples 5 to 7 consistently delivered an As extraction of 85%.

Procedure 7.5 liter titanium reactors were employed, with the overflow from the first connected to the second, which subsequently overflowed into a holding tank. During continuous operation, 2 liters/hr of solution was fed to the first reactor from a feed tank using a peristaltic pump. The solids addition rate was 144 g/h and was achieved through 24 g (dry basis) batch additions of concentrate to the first reactor every 10 minutes;

Initially a 30 liter stock solution containing 80 g/l $Cu^{2+}$, 200 g/l NaCl, 100 g/l $CaCl_2$, and pH<1 was prepared. To each reactor, 7.5 l of stock solution was added and maintained at 100° C., with 360 g of dry equivalent P80=30 microns low grade gold (30 gr/tonne) concentrate added and the resultant slurry agitated and monitored every 30 mins for Eh, pH, As, Fe and Cu. After 3 hours, a 100 ml slurry sample was taken and filtered in a Buchner funnel and washed with acidic brine solution. The solids were then dried and assayed by ICP for copper, arsenic and iron.

After 3 hours, continuous operation was conducted (as described) for a further 10 hours, with a 200 ml slurry sample taken every 2 hours and filtered as described above. The solids were then dried and assayed by ICP for copper, arsenic and iron.

The results are summarised in the following tables:

| | | | | Tank 1 | | | | | | |
|---|---|---|---|---|---|---|---|---|---|---|
| Ref # | Solid Sample | Time (min) | Sample (#) | T (° C.) | Eh mV | pH | Cu (gpl) | Fe (gpl) | As (gpl) | Comments |
| 0 | | 0 | 0 | 95 | 620 | 1 | 77 | 0 | 0 | |
| 1 | | | | | | | | | | Added 720 g dry solids |
| 2 | | 60 | 1 | 100 | 520 | 0.5 | 87 | 2.6 | 2.3 | All additions below are in "as is" moist concentrate |
| 3 | | 120 | 2 | 100 | 520 | 0.5 | 83 | 2.7 | 2.3 | 192.95 g added over the hour |
| 4 | | 180 | 3 | 90 | 530 | 0.7 | 81 | 1.7 | 1.4 | 187.9 g added over the hour |
| 5 | | 240 | 4 | 98 | 535 | 0.6 | 88 | 1.9 | 1.6 | 183.4 g added over the hour |
| 6 | | 300 | 5 | 103 | 540 | 0.4 | 89 | 2.5 | 2.1 | 189.65 g added over the hour |
| 7 | 1 | 360 | 6 | 109 | 530 | 0.2 | 74 | 2.2 | 1.9 | 195.44 g added over the hour |
| 8 | | 420 | 7 | 109 | 535 | 0.2 | 95 | 3.7 | 3.3 | 194.42 g added over the hour |
| 9 | 2 | 480 | unstable | conditions | | | | | | 31.61 g added over the hour |
| 10 | | 540 | 8 | 106 | 525 | 0.2 | 95 | 4.9 | 4.5 | 200 g added over the hour |
| 11 | | 600 | 9 | 102 | 524 | 0.3 | 95 | 4.2 | 3.8 | 198.79 added over the hour |
| 12 | 3 | 660 | 10 | 70 | 509 | 0.7 | 98 | 3.2 | 2.6 | 62.82 g added over the hour |
| 13 | 4 | 680 | 11 | 74 | 501 | 0.8 | 99 | 3 | 2.4 | |

| | | | Tank 2 | | | | | |
|---|---|---|---|---|---|---|---|---|
| Ref # | Hours | Time (min) | Sample (#) | T (° C.) | Eh mV | pH | Cu (gpl) | Fe (gpl) | As (gpl) |
| 0 | | 0 | 0 | 80 | 620 | | | | |
| 1 | | | | | | | | | |
| 2 | | 60 | 1 | 85 | 530 | 0.9 | 77 | 1.3 | 1 |
| 3 | | 120 | 2 | 86 | 530 | 0.8 | 81 | 1.5 | 1.2 |
| 4 | | 180 | 3 | 90 | 530 | 0.7 | 84 | 1.7 | 1.5 |
| 5 | | 240 | 4 | 88 | 530 | 0.6 | 86 | 1.8 | 1.6 |
| 6 | | 300 | 5 | 85 | 525 | 0.5 | 91 | 2.1 | 1.8 |
| 7 | | 360 | 6 | 85 | 520 | 0.4 | 95 | 2.2 | 2 |
| 8 | | 420 | 7 | 85 | 520 | 0.4 | 105 | 2.7 | 2.3 |
| 9 | | 480 | unstable | conditions | | | | | |
| 10 | | 540 | 8 | 84 | 519 | 0.4 | 99 | 2.8 | 2.5 |
| 11 | | 600 | 9 | 83 | 514 | 0.4 | 98 | 3.2 | 2.9 |
| 12 | | 660 | 10 | 83 | 516 | 0.4 | 98 | 3.5 | 3.1 |
| 13 | | 680 | 11 | 83 | 512 | 0.4 | 99 | 3.3 | 2.94 |

Solid Analysis Feed and Tank 2 Overflow

| Ref # | Description | | Fe (%) | As (%) | Cu (%) | As Extraction (%) | Mass Loss (%) |
|---|---|---|---|---|---|---|---|
| | Feed | | 8.60 | 3.20 | 0.08 | 0.00 | 0.00 |
| 1 | Tank 2 | Solids 1 | 4.25 | 0.58 | 0.50 | 83.1 | 6.55 |
| 2 | | Solids 2 | 4.15 | 0.42 | 0.52 | 87.8 | 6.79 |
| 3 | | Solids 3 | 4.55 | 0.51 | 0.55 | 85.1 | 6.27 |
| 4 | | Solids 4 | 4.15 | 0.51 | 0.42 | 85.1 | 6.80 |
| mix | | Solids 5 | 4.50 | 0.52 | 0.42 | 84.8 | 6.44 |
| Average | | | | | | 85.2 | 6.57 |

Example 12

Second Stage Leaching

The aim of this experiment was to evaluate the possibility of oxidising the pyrite component of the residue from an As leach, at atmospheric pressure with pure oxygen. 500 g of the residue obtained during the continuous leach test of Example 11 was used in this experiment.

The pyrite was successfully oxidised with oxygen at atmospheric pressure and 105° C. The final As and Fe extraction were both above 95%. The $S_{(e)}$ (elemental sulfur) in the oxidation residue was equivalent to the sulfur associated with the arsenopyrite in the concentrate. The results are presented graphically in FIG. 9.

Procedure

A 7.5 L titanium reactor was prepared with a turbine agitator for gas dispersion and the appropriate titanium gas injector on a large yellow hotplate. 5 L of brine solution was prepared in 7.5 L titanium reactor with the following composition: 250 g/L NaCl, 50 g/L $CaCl_2$, 20 g/L Cu (from cupric chloride) and pH adjusted<1.0.

A representative sample of dry As leach residue from Example 11 was sent to an external lab to analyse for elemental S, total S, Au, Fe and As.

With the agitator drive set at 80 Hz on the VSD, the temperature of the solution was raised to 105° C., sample t=0 is taken, Eh & pH were monitored and 500 g of dry arsenic leach residue from Example 11 was introduced into the solution. After 30 minutes, a sample of solution was taken for Fe, As & Cu analysis and Eh and pH were monitored.

Oxygen was introduced at the rate of 1 L/min. Eh, pH, Fe, Cu and As were monitored every 30 minutes for the first 3 hours and every hour after that. When the soluble Fe assay stopped increasing, the experiment was considered complete.

The last sample was taken, the suspension filtered, the cake washed twice with acidic brine followed by hot water until the filtrate was clear. The washed cake was dried, weighed and analysed for As, Fe, Cu, C, elemental S and total S.

EXPERIMENTAL RESULTS

The following experimental results were observed

Final Leach Solid Weight

Cake:

Wet cake+paper+filter paper: 744.27

Dry cake+paper+filter paper: 490.96

Paper+filter paper: 66.09

Dry cake obtained: 424.87

Mass reduction: 15%

Solid Analysis Feed to Pyrite Oxidation with Oxygen
Information in dry wt % or ppm as noted

| Description | Fe (%) | As (%) | Cu (%) | Au ppm | $S_t$ (%) | $S_e$ (%) |
|---|---|---|---|---|---|---|
| Total | 4.31 | 0.55 | 0.61 | — | — | — |
| Soluble | 0.01 | 0.03 | 0.10 | — | — | — |
| Insoluble | 4.30 | 0.51 | 0.51 | — | — | — |

Solid Analysis Residue from Pyrite Oxidation with Oxygen
Information in dry wt % or ppm as noted

| Description | Fe (%) | As (%) | Cu (%) | Au ppm | $S_t$ (%) | $S_e$ (%) |
|---|---|---|---|---|---|---|
| Total | 0.52 | 0.19 | 0.35 | — | — | — |
| Soluble | 0.01 | 0.01 | 0.01 | — | — | — |
| Insoluble | 0.51 | 0.18 | 0.34 | — | — | — |

Fe & As Extraction from Concentrate to Pyrite Oxidation Residue

Both As and Fe extraction exceeded 95% as demonstrated in the following tables:

Pyrite oxidation, feed vs. residue:

| | Wt % | | Mass (g) | |
|---|---|---|---|---|
| | Feed | Residue | Feed | Residue |
| | | | 500 | 424.9 |
| Fe | 4.3 | 0.51 | 21.6 | 2.2 |
| As | 0.5 | 0.18 | 2.6 | 0.8 |

Equivalent Concentrate

| | Mass (g) | Concentration (%) |
|---|---|---|
| | 535.2 | 100 |
| As | 17.1 g | 3.2 |
| FeAsS | 37.2 | 7.0 |
| Fe | 46.0 | 8.6 |
| $FeS_2$ | 25.6 | 4.8 |
| S | 29.4 | 5.5 |
| S in FeAsS | 7.3 | 1.4 |
| S in $FeS_2$ | 22.1 | 4.1 |
| Fe in AsFeS | 12.8 | 2.4 |
| Fe in FeS2 | 19.3 | 3.6 |
| Fe other | 14.0 | 2.6 |

Fe and As Extraction from Concentrate to Pyrite Oxidation Residue:

| Fe | 95.3% |
|---|---|
| As | 95.5% |

Extraction of elemental sulphur from the pyrite oxidation residue demonstrated the S(e) is equivalent to the S associated with the AsFeS or 1.4% in the concentrate

| Elemental Sulfur Extraction | | |
|---|---|---|
| Float Head Sample weight | 8.68 g | 100% |
| $S_{(e)}$ extraction residue | | |
| Total | 0.35 g | |
| Carbon | 0.21 g | |
| $S_{(e)}$ | 0.14 g | 1.6% |
| Mass Change | | 79% |
| $S_{(e)}$ related to concentrate | | 1.28% |

Now that preferred processes have been exemplified, it will be appreciated by those skilled in the art that present invention provides the following advantages:

The process can be employed to recover precious metals from sulfidic ores and concentrates which are otherwise difficult or impossible to treat using conventional available processes/techniques such as smelting and roasting.

The process can accommodate a high carbon content in such ores, because it is conducted in solution, and thus blinding agents can be employed to prevent precious metal adsorption onto carbon, which can otherwise interfere with precious metal recovery.

The process can be employed to remove contaminants from a wide variety of ore and concentrate feedstocks which, once removed, can then be treated using conventional smelting/roasting techniques.

The process enables removal of arsenic, iron and sulfur in readily disposable forms from an original arsenopyrite concentrate, leaving a readily treatable concentrate.

The process has the capacity to recover a wide variety of metals of economic value, especially precious metals, using simple non-cyanide based leaching and separation processes, and including activated carbon adsorption.

The process can be used to treat contaminated residues to allow them to be subsequently disposed of with reduced environmental impact.

Whilst the invention has been described with reference to a number of preferred embodiments, it should be appreciated that the invention can be embodied in many other forms.

The invention claimed is:

1. A process for recovering a precious metal from a sulfidic material comprising the steps of:
preparing an acidic aqueous halide solution comprising a mixture of metal halides that has an oxidation potential sufficient to oxidize the sulfidic material and render the precious metal soluble in the solution;
adding the material to the acidic aqueous halide solution so that the sulfidic material is oxidized and the precious metal is solubilised; and
separating the precious metal from the oxidized sulfidic material;
wherein the metal in the mixture of metal halides is selected to function as a multi-valent species during oxidation of the sulfidic material.

2. A process for recovering a precious metal from a sulfidic material contaminated with arsenic comprising the steps of:
preparing an acidic aqueous halide solution comprising a mixture of halides that has an oxidation potential sufficient to oxidize the sulfidic material and render the precious metal soluble in the solution, and having a pH at which the arsenic is precipitated;
adding the material to the acidic aqueous halide solution so that the sulfidic material is oxidized, the precious metal is solubilised and the arsenic is precipitated; and separating the precious metal from the oxidized sulfidic material and precipitated arsenic.

3. A process as claimed in claim 1 or 2 wherein the solution bearing the precious metal is separated from the oxidized sulfidic material and precipitated arsenic (when present) in a solid-liquid separation stage, and the precious metal is then recovered from the solution in a metal recovery stage.

4. A process as claimed in claim 3 wherein in the metal recovery stage the precious metal is adsorbed onto activated carbon in one or more carbon-containing columns.

5. A process as claimed in claim 4 wherein after precious metal adsorption onto activated carbon the carbon is eluted with a cyanide solution and the eluate is passed to an electrolysis stage for the recovery of the precious metal.

6. A process as claimed in claim 3 wherein the metal recovery stage is provided in-line, after the solid-liquid separation stage, and prior to solution recycle to sulfidic material oxidation.

7. A process as claimed in claim 1 wherein the precious metal to be recovered is gold, silver, platinum or another platinum group metal.

8. A process as claimed in claim 1 wherein the metal halide solution has a halide concentration of approximately 8 moles per liter.

9. A process as claimed in claim 8 wherein the halide is chloride or a mixture of halides comprising chloride and bromide.

10. A process as claimed in claim 8 or 9 wherein the metal in the dissolved metal halide solution is copper and/or iron.

11. A process as claimed in claim 1 wherein the sulfidic material oxidation step comprises one or more leaching stages such that:
    (i) for an un-contaminated single-refractory pyritic material the sulfidic material oxidation step comprises a single leaching stage in which the pyritic material is oxidized and the precious metal simultaneously solubilised; or
    (ii) for a contaminated single or double refractory pyritic material, the sulfidic material oxidation step comprises a two stage leaching process wherein the solution from the first leaching stage is fed to the second leaching stage.

12. A process as claimed in claim 11 wherein for (ii) the pyritic material is an arsenopyrite, and in a first of the leaching stages the oxidation potential is controlled to leach arsenic into solution and the solution pH is controlled such that, once leached, the arsenic precipitates as ferric arsenate, and in a second of the leaching stages the pyrite component is leached and the solution pH is controlled to maintain arsenic as a ferric arsenate precipitate so that the arsenic passes out of the process with the oxidized sulfidic material.

13. A process as claimed in claim 12 wherein in the first leaching stage the material is contacted with solution at an Eh of around 0.7-0.8 volts sufficient to leach the contaminant and solubilise the precious metal, at a solution pH that is less than 1 but greater than about 0.5 so as to precipitate the arsenic immediately after it is leached, and at a solution temperature of about 80-105.degree. C.

14. A process as claimed in claim 12 or 13 wherein in the second leaching stage the material is contacted with a solution having an Eh of around 0.8-0.9 volts sufficient to leach pyrite, the solution pH is less than 1 but greater than about 0.2 so as to precipitate the arsenic immediately after it is leached, and at a solution temperature about 90.degree. C. to 105.degree. C.

15. A process as claimed in claim 1 wherein after precious metal recovery a solution conditioning stage is employed to precipitate ferric sulfate and thus control the level of this species in the process.

16. A process as claimed in claim 15 wherein in the solution conditioning stage limestone and calcium carbonate are added to the solution to form a hematite/gypsum precipitate which is then filtered and disposed of with the solids residue from the leaching stage(s).

17. A process as claimed in claim 1 wherein, when a high level of carbon is present in the sulfidic material, a surfactant is added to the solution during the sulfidic material oxidation step to prevent precious metal from adsorbing onto carbon in the material, or activated carbon is added to the solution during the sulfidic material oxidation step to preferentially adsorb precious metal onto the activated carbon.

18. A process as claimed in claim 17 wherein the surfactant is one or more organic solvents including kerosene or a phenol ether.

* * * * *